(12) United States Patent
Geren et al.

(10) Patent No.: US 12,500,645 B2
(45) Date of Patent: Dec. 16, 2025

(54) REMOTE BEAM STEERING FOR A MILLIMETER WAVE REPEATER

(71) Applicant: Intel Corporation, Santa Clara, CA (US)

(72) Inventors: Bruce Geren, Chandler, AZ (US); Wayne Ballantyne, Chandler, AZ (US); Gregory Chance, Chandler, AZ (US); Xi Li, Chandler, AZ (US); Peter Pawliuk, Tempe, AZ (US); Nebil Tanzi, Hoffman Estates, IL (US)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 17/550,629

(22) Filed: Dec. 14, 2021

(65) Prior Publication Data

US 2023/0188194 A1    Jun. 15, 2023

(51) Int. Cl.
| | | |
|---|---|---|
| H04L 23/02 | (2006.01) |
| H04B 7/06 | (2006.01) |
| H04B 7/155 | (2006.01) |
| H04W 76/14 | (2018.01) |
| H04W 76/32 | (2018.01) |
| H04W 74/0833 | (2024.01) |

(52) U.S. Cl.
CPC ....... *H04B 7/0695* (2013.01); *H04B 7/15507* (2013.01); *H04W 76/14* (2018.02); *H04W 76/32* (2018.02); *H04W 74/0833* (2013.01)

(58) Field of Classification Search
CPC ............... H04B 7/15507; H04B 7/043; H04B 7/15542; H04W 4/029; H04W 76/10; H01Q 1/02; H01Q 1/364
USPC ......................................... 375/262, 260, 267
See application file for complete search history.

(56) References Cited

U.S. PATENT DOCUMENTS

| | | | |
|---|---|---|---|
| 12,082,134 B2 * | 9/2024 | Abedini ................. | H04W 16/28 |
| 2021/0274652 A1 * | 9/2021 | Kim ....................... | H01Q 21/065 |
| 2021/0306064 A1 * | 9/2021 | Abedini .............. | H04B 7/15542 |
| 2021/0376461 A1 * | 12/2021 | Dallal .................. | H01Q 25/007 |
| 2022/0190901 A1 * | 6/2022 | Hartman ................... | H04L 1/18 |

* cited by examiner

*Primary Examiner* — Khai Tran
(74) *Attorney, Agent, or Firm* — Schwegman Lundberg & Woessner, P.A.

(57) ABSTRACT

A wireless communication device can include modem circuitry to connect the UE to a repeater over a side-link connection. The device can also include processing circuitry to control a repeater beamforming process to select a beam angle from the repeater to a base station and initiate a communication procedure using the selected beam angle. Other methods, systems and apparatuses are described.

18 Claims, 16 Drawing Sheets

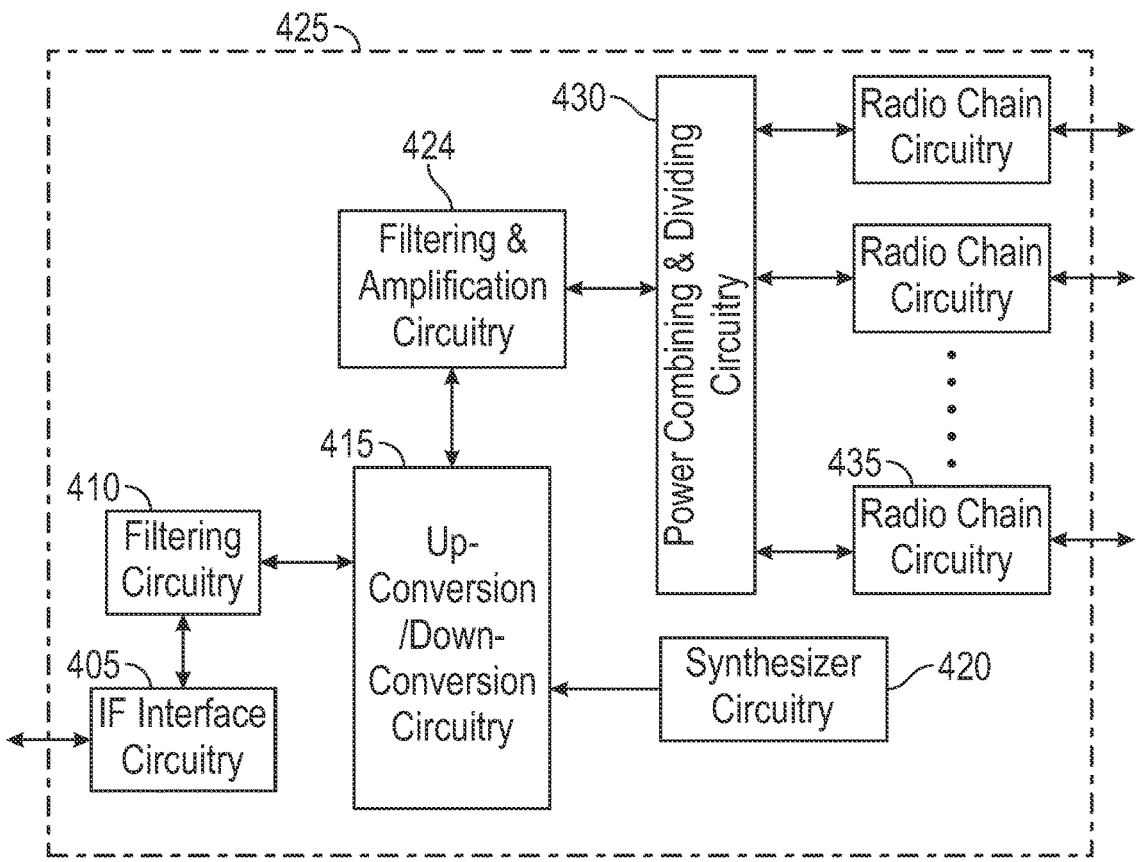
FIG. 4
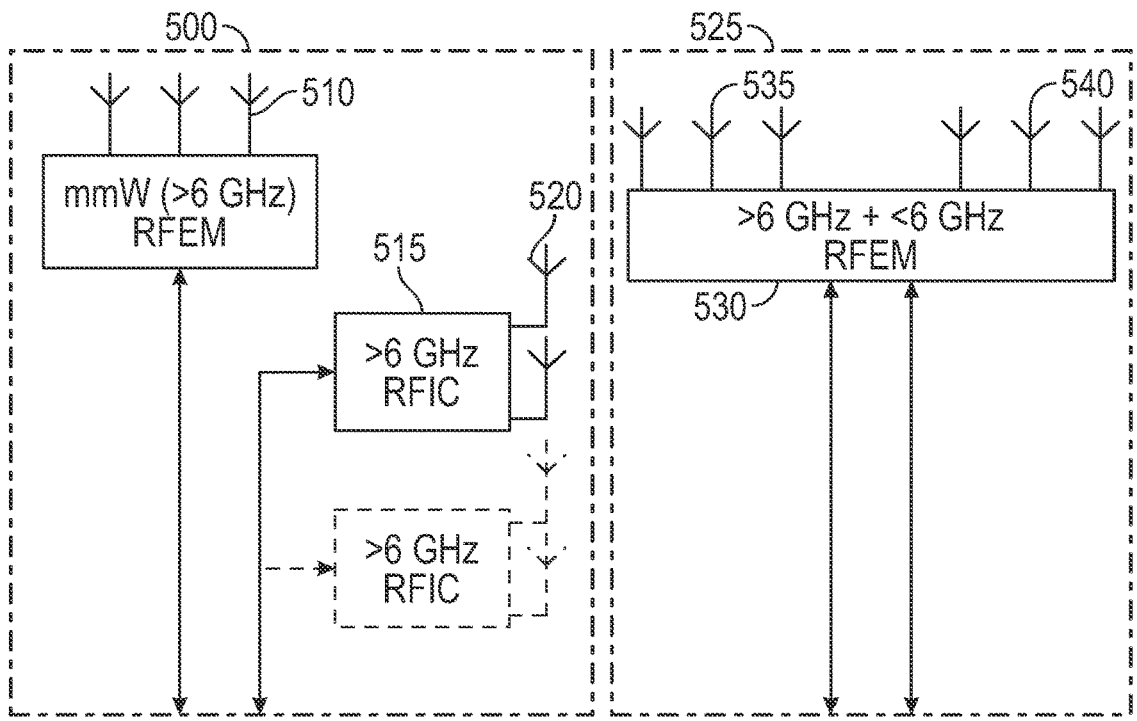
FIG. 5A
FIG. 5B

REMOTE BEAM STEERING FOR A MILLIMETER WAVE REPEATER

TECHNICAL FIELD

Aspects of the disclosure pertain to radio frequency (RF) communications. More particularly, aspects relate to repeater communications.

BACKGROUND

Fifth Generation (5G) millimeter wave promises high data rates and low latency. However, millimeter wave radio frequency (RF) communication range is limited and relies on beam forming antenna arrays for effective communication. Repeaters can be used to increase effective range and to improve communications within buildings. However, low-cost alternatives cannot effectively perform beamforming. Therefore, there is a general need for a cost-effective solution that can configure beamforming of a repeater beam.

BRIEF DESCRIPTION OF THE DRAWINGS

In the drawings, which are not necessarily drawn to scale, like numerals may describe similar components in different views. Like numerals having different letter suffixes may represent different instances of similar components. Some aspects are illustrated by way of example, and not limitation, in the figures of the accompanying drawings in which:

FIG. 4 illustrates exemplary useable RF circuitry in FIG. 3A according to some aspects.

FIG. 5A illustrates an aspect of an exemplary radio front end module (RFEM) according to some aspects.

FIG. 5B illustrates an alternate aspect of an exemplary radio front end module, according to some aspects.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

5G mm Wave technology can provide high data rates and low latency. However, the mm Wave RF communication range is very limiting (often 300 meters or less) and relies on beam forming antenna arrays to steer the beam toward its target to meet these ranges and improve penetration within buildings. One solution is to install repeaters to increase the effective range and penetration at a site. However, these repeaters must also implement antenna arrays for beam forming between the repeater and a base station (e.g., evolved Node-B (eNB), a new generation Node-B (gNB), etc.) However, current 3rd Generation Partnership (3GPP) 5G new radio (NR) definition for beam forming/steering is between a gNB and user equipment (UE) with no special consideration given for having a repeater between the gNB and UE. Therefore, a cost-effective solution is needed to perform a configuration of the repeater to accurately steer or align a repeater beam towards the gNB while not adding significant cost impact to the repeater.

To address these and other concerns, in aspects, the disclosure provides apparatus of a UE to connect to repeaters over, for example, the side-link and perform a repeater beamforming process on behalf of the repeater. This allows for repeater beamforming provided at least in part by elements besides the repeaters, thereby avoiding adding functionality and costs to the repeaters. The UE and other components of such a system are described in more detail with respect to FIG. 1-9.

Figure 1:
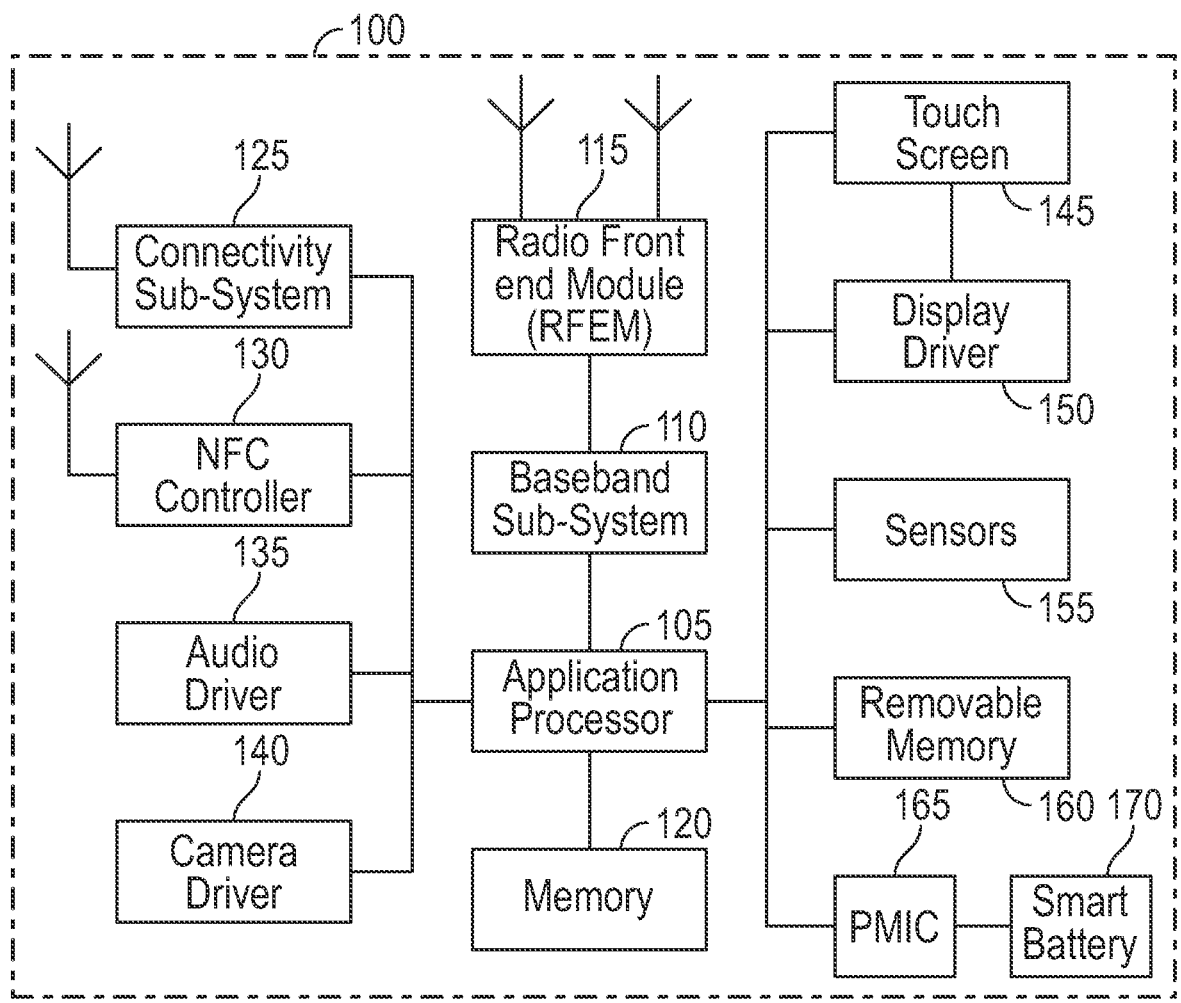
FIG. 1 illustrates an exemplary user device according to some aspects.

An integrated Radio-Frequency frontend module (FEM) is broadly used in the frontend circuits for cellular handsets or other wireless devices. FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real time clock (RTC), timer-counters including interval and watchdog timers, general purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mm Wave technology can include, for example, WiGig and future 5G, but the mm Wave technology can be applicable to a variety of telecommunications systems. The mm Wave technology can be especially attractive for short-range telecommunications systems. WiGig devices operate in the unlicensed 60 GHz band, whereas 5G mm Wave is expected to operate initially in the licensed 28 GHz and 39 GHz bands. A block diagram of an example baseband processor 110 and RFEM 115 in a mm Wave system is shown in FIG. 1A.

Figure 1A:
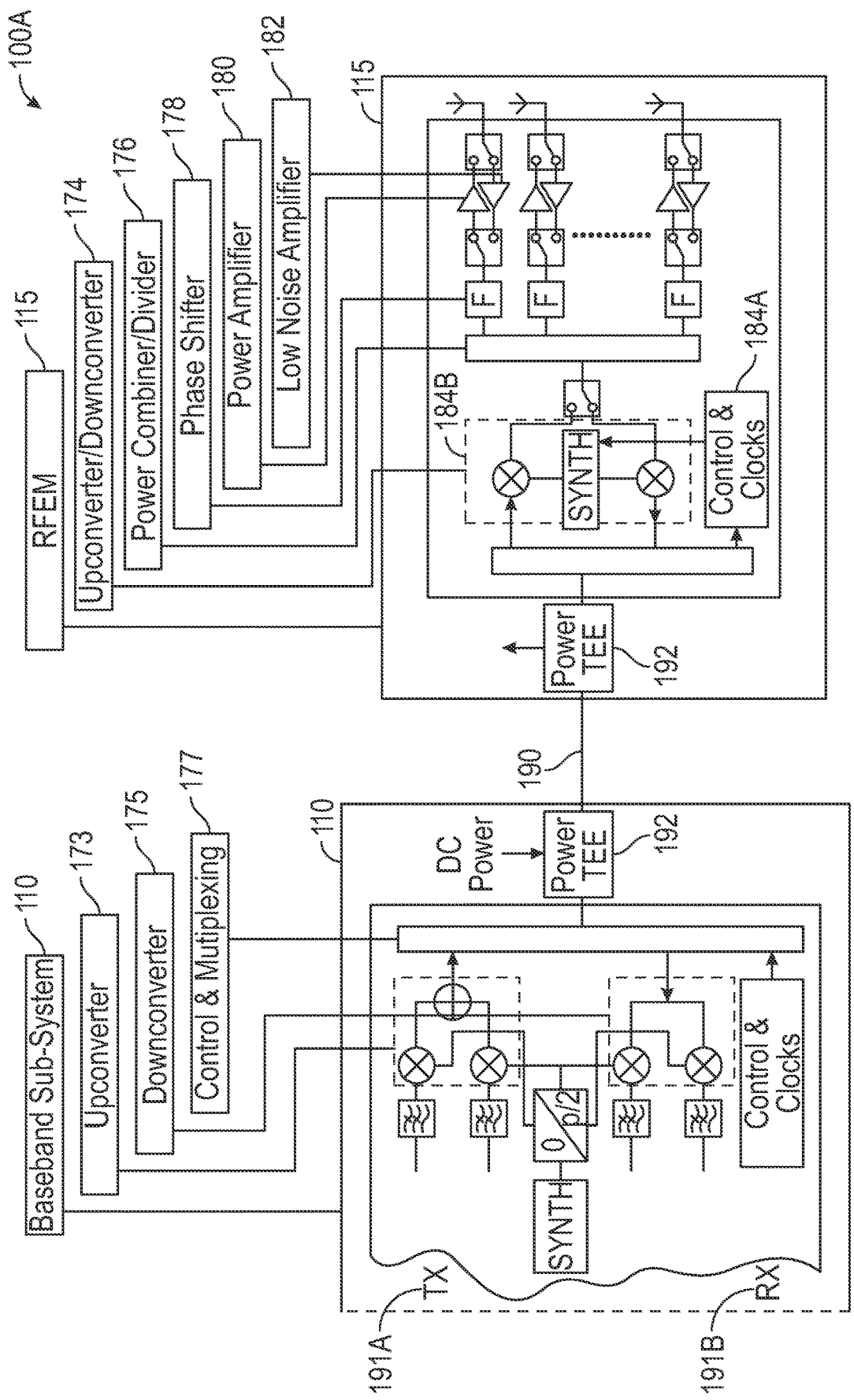
FIG. 1A illustrates a mm Wave system, which can be used in connection with the device of FIG. 1 according to some aspects.

FIG. 1A illustrates a mm Wave system 100A, which can be used in connection with the device 100 of FIG. 1 according to some aspects of the present disclosure. The system 100A includes two components: a baseband processor 110 and one or more radio front end modules (RFEMs) 115. The RFEM 115 can be connected to the baseband processor 110 by a single coaxial cable 190, which supplies a modulated intermediate frequency (IF) signal, DC power, clocking signals and control signals.

The baseband processor 110 is not shown in its entirety, but FIG. 1A rather shows an implementation of analog front end. This includes a transmitter (TX) section 191A with an upconverter 173 to intermediate frequency (IF) (around 10 GHz in current implementations), a receiver (RX) section 191B with downconversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mm Wave 5G apparatuses, techniques and features is discussed hereinbelow.

Figure 2:
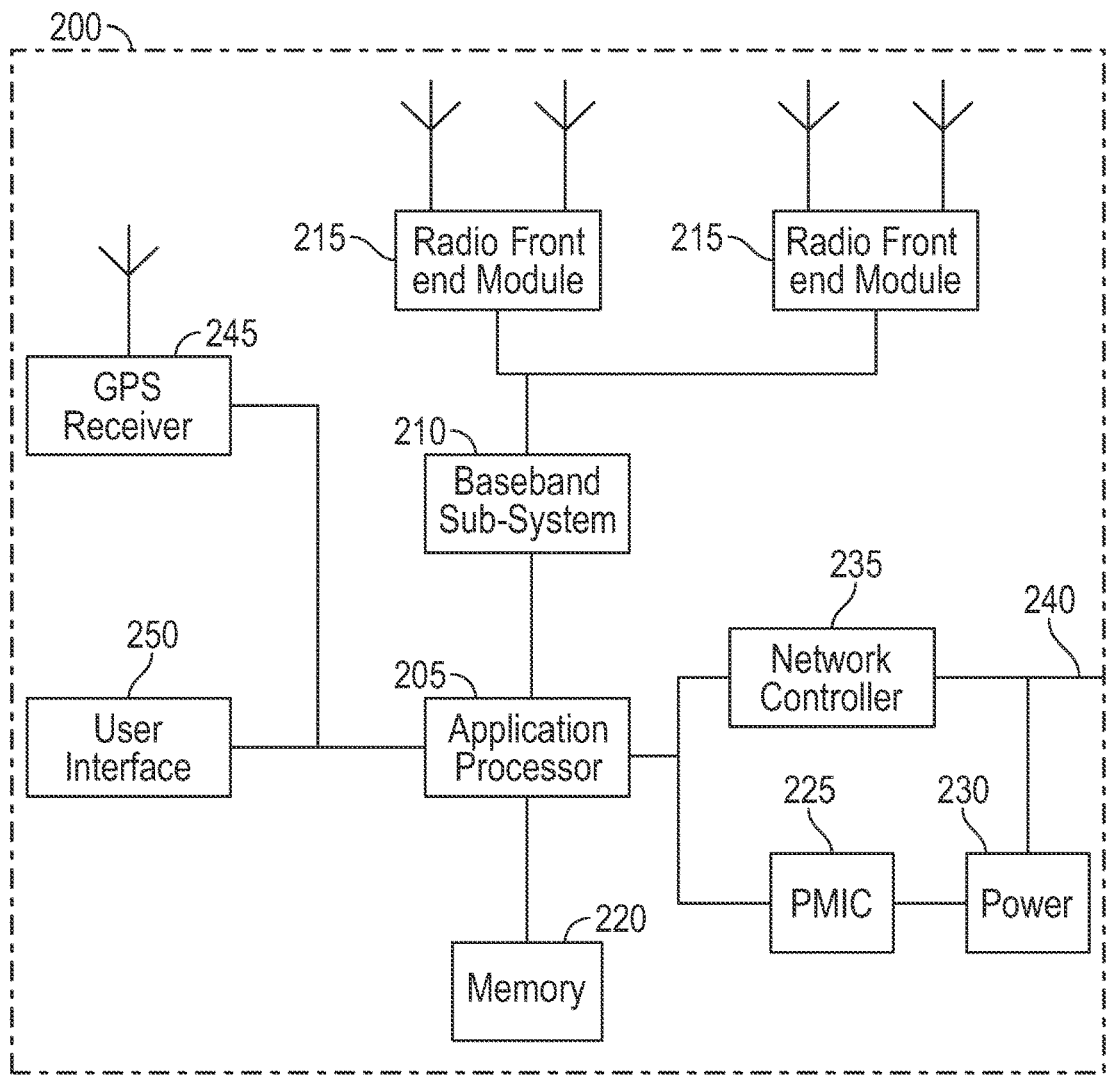
FIG. 2 illustrates an exemplary base station radio head according to some aspects.

FIG. 2 illustrates an exemplary base station or infrastructure equipment radio head according to some aspects. The base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnilkovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3A:
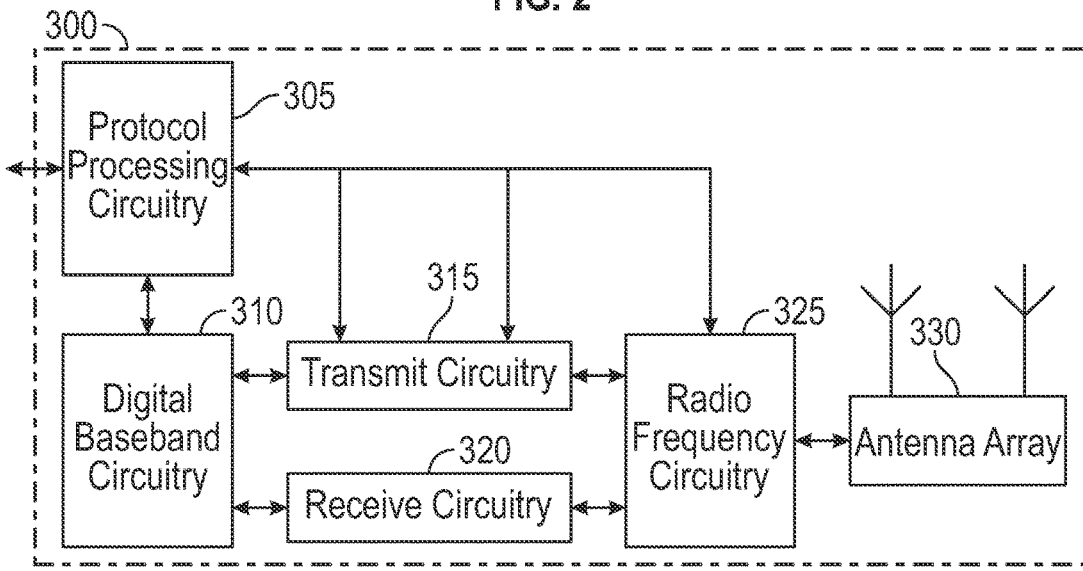
FIG. 3A illustrates exemplary wireless communication circuitry according to some aspects.
Figure 3B:
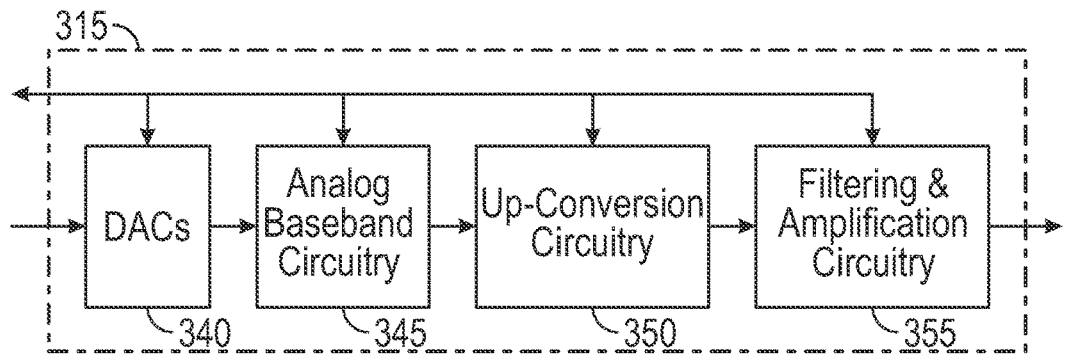
FIG. 3B illustrates aspects of exemplary transmit circuitry illustrated in FIG. 3A according to some aspects.
Figure 3C:
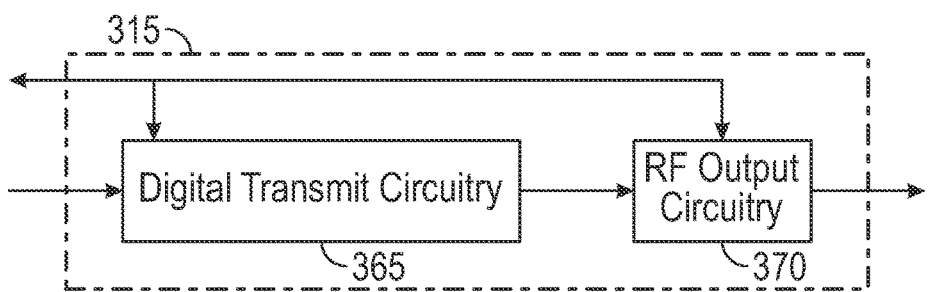
FIG. 3C illustrates aspects of exemplary transmit circuitry illustrated in FIG. 3A according to some aspects.
Figure 3D:
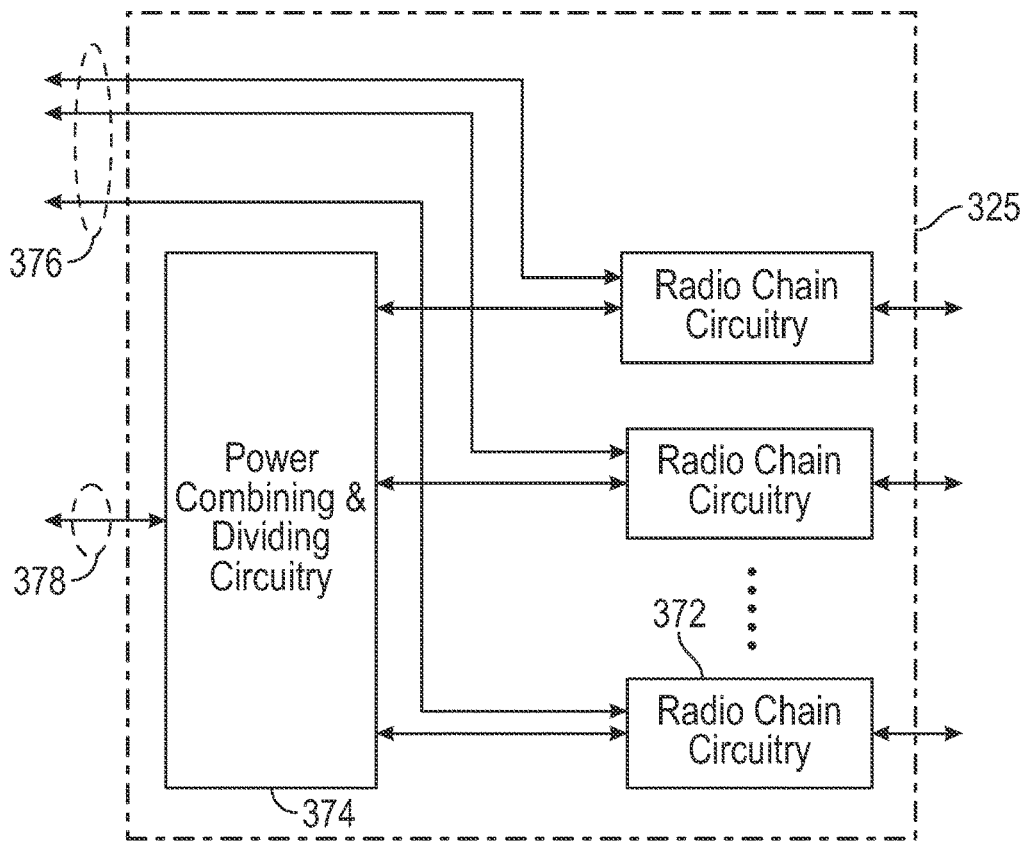
FIG. 3D illustrates aspects of exemplary radio frequency circuitry illustrated in FIG. 3A according to some aspects.
Figure 3E:
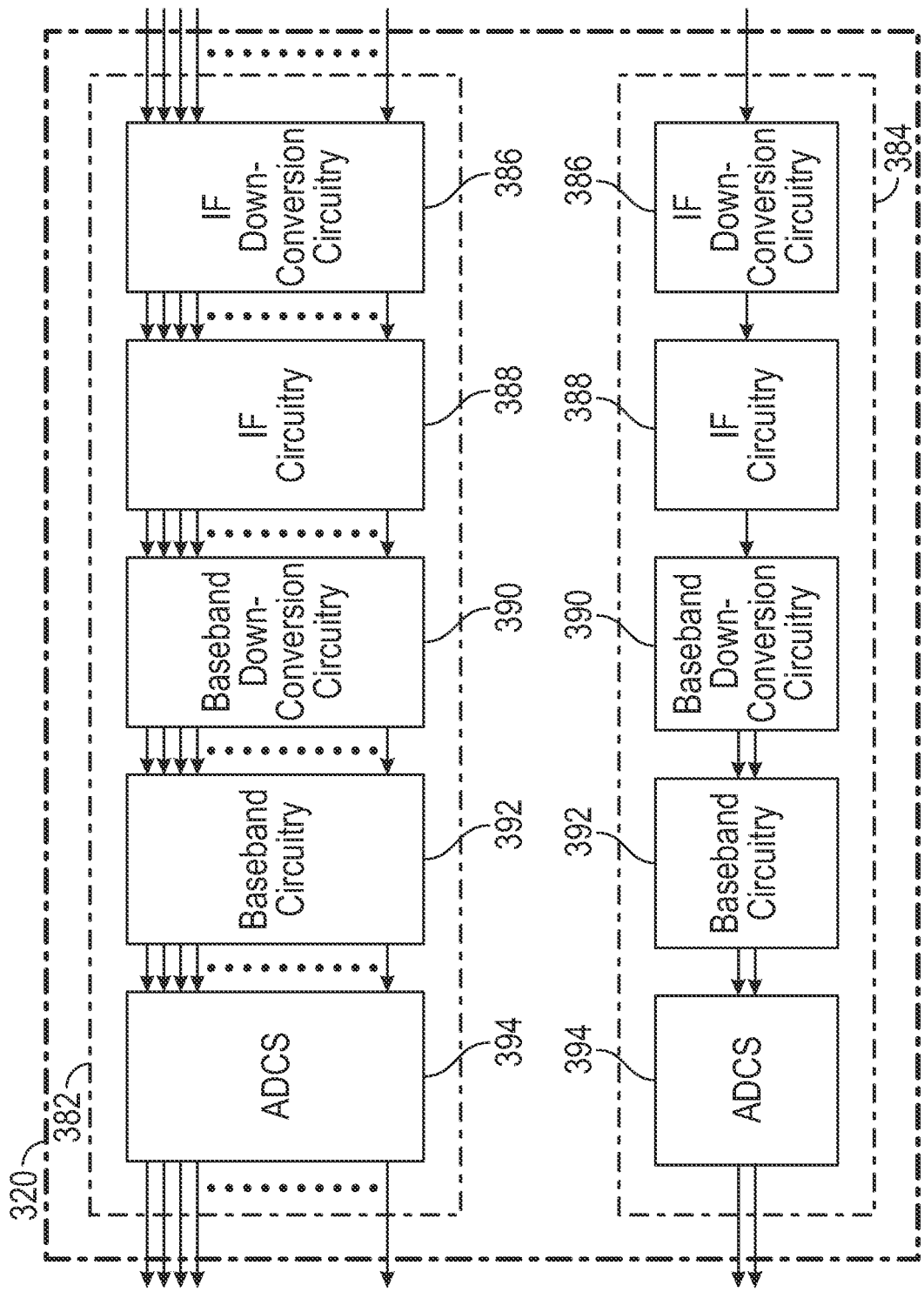
FIG. 3E illustrates aspects of exemplary receive circuitry in FIG. 3A according to some aspects.

FIG. 3A illustrates exemplary wireless communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Wireless communication circuitry 300 shown in FIG. 3A may be alternatively grouped according to functions. Components illustrated in FIG. 3A are provided here for illustrative purposes and may include other components not shown in FIG. 3A.

Wireless communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Wireless communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Wireless communication circuitry 300 may further include transmit circuitry 315, receive circuitry 320 and/or antenna array circuitry 330. Wireless communication circuity 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mm Wave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

FIG. 5A and FIG. 5B illustrate aspects of a radio front-end module (RFEM) useable in the circuitry shown in FIG. 1 and FIG. 2, according to some aspects. FIG. 5A illustrates an aspect of a RFEM according to some aspects. RFEM 500 incorporates a millimeter wave RFEM 505 and one or more above-six gigahertz radio frequency integrated circuits (RFIC) 515 and/or one or more sub-six gigahertz RFICs 522. In this aspect, the one or more sub-six gigahertz RFICs 515 and/or one or more sub-six gigahertz RFICs 522 may be physically separated from millimeter wave RFEM 505. RFICs 515 and 522 may include connection to one or more antennas 520. RFEM 505 may include multiple antennas 510.

FIG. 5B illustrates an alternate aspect of a radio front end module, according to some aspects. In this aspect both millimeter wave and sub-six gigahertz radio functions may be implemented in the same physical radio front end module (RFEM) 530. RFEM 530 may incorporate both millimeter wave antennas 535 and sub-six gigahertz antennas 540.

Figure 6:
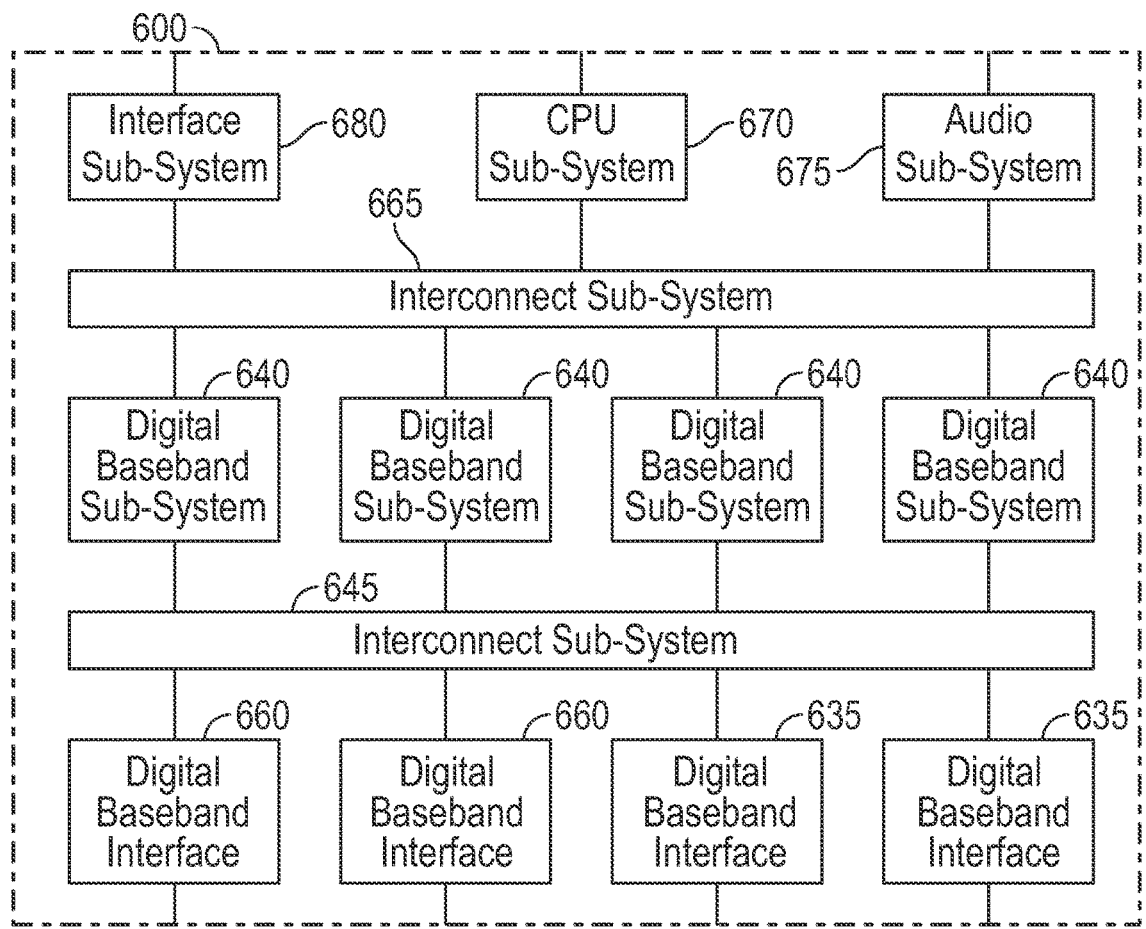
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry shown in FIG. 1 or FIG. 2, according to some aspects. In an aspect, baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NGC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
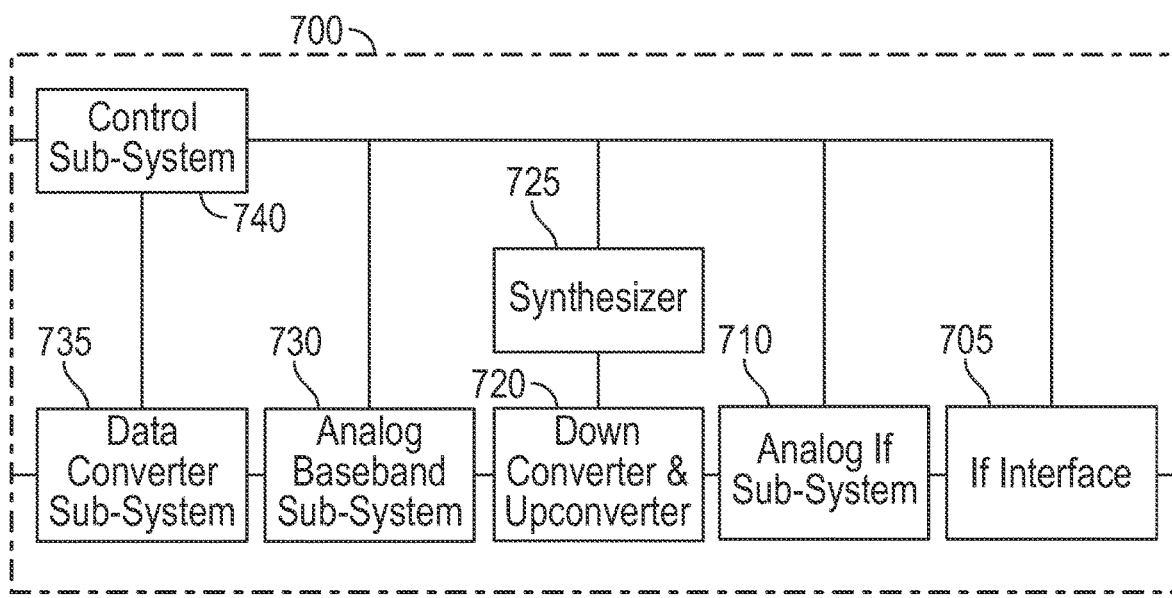
FIG. 7 illustrates an exemplary mixed signal baseband subsystem, according to some aspects.

FIG. 7 illustrates an exemplary of a mixed signal baseband subsystem 700, according to some aspects. In an aspect, mixed signal baseband subsystem 700 may include one or more of interface 705, analog IF subsystem 710, down-converter and up-converter subsystem 720, analog baseband subsystem 730, data converter subsystem 735, synthesizer 725 and control subsystem 740.

Figure 8A:
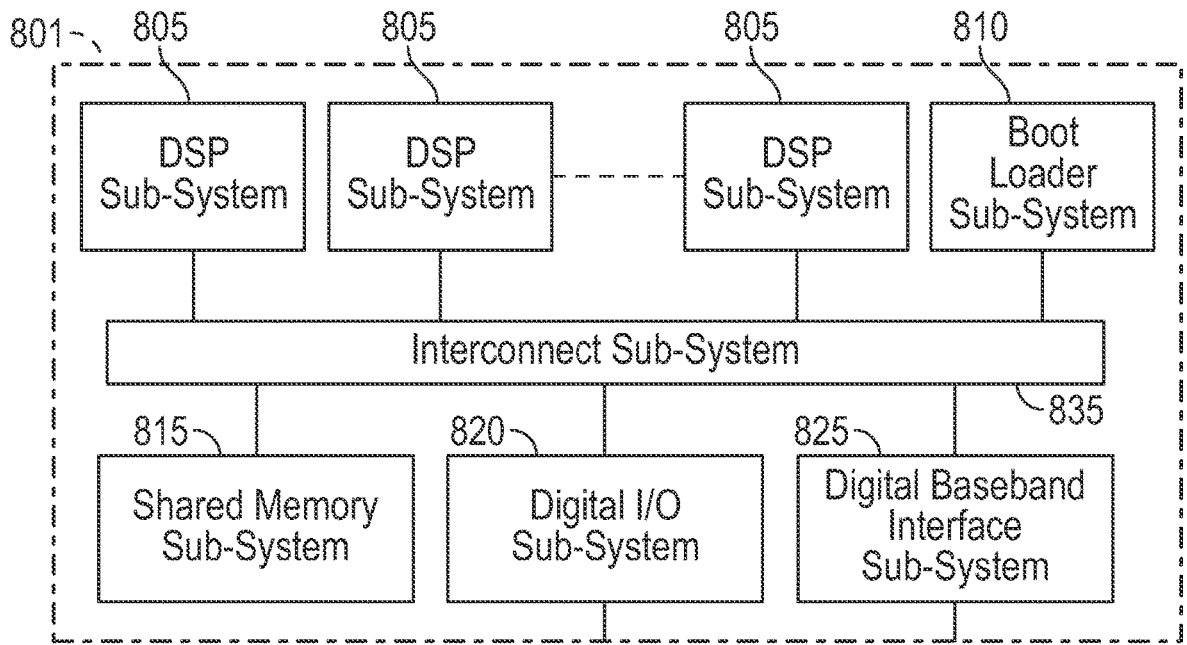
FIG. 8A illustrates an exemplary digital baseband subsystem, according to some aspects.
Figure 8B:
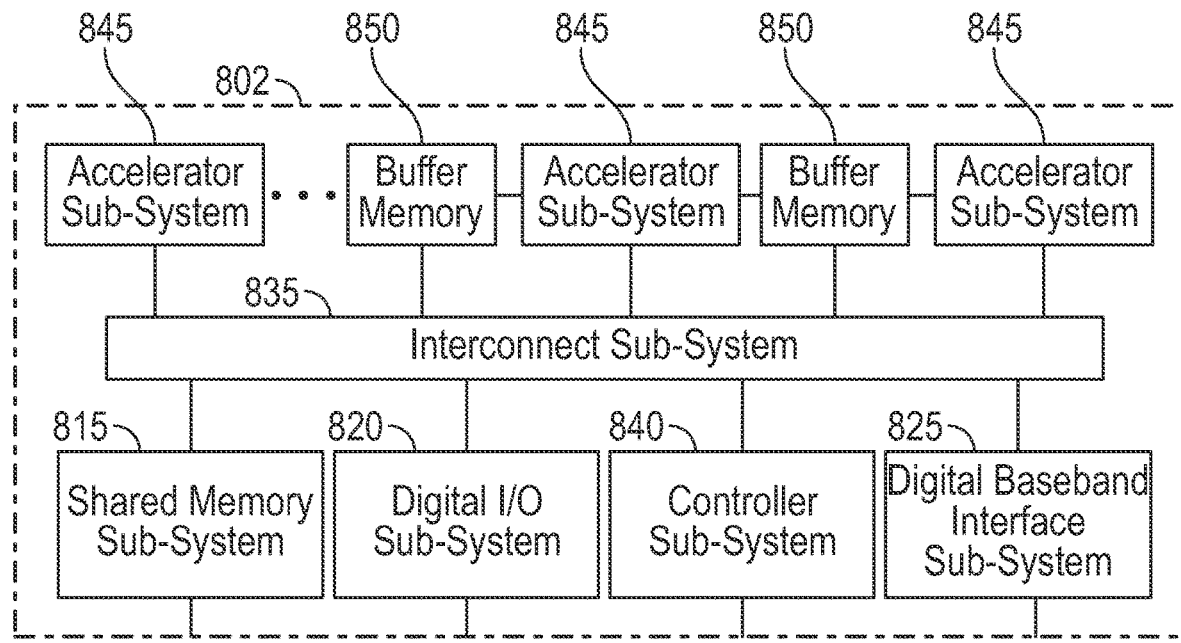
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, . . . 805N, interconnect subsystem 835, boot loader subsystem 810, shared memory subsystem 815, digital I/O subsystem 820, and digital baseband interface subsystem 825.

In an aspect of FIG. 8B, digital baseband processing subsystem 802 may include one or more of each of accelerator subsystem 845A, 845B, . . . 845N, buffer memory 850A, 850B, . . . 850N, interconnect subsystem 835, shared memory subsystem 815, digital I/O subsystem 820, controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running, and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I2C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital baseband processing subsystem 801.

In an aspect, digital baseband interface subsystem 825 may provide for the transfer of digital baseband samples between baseband processing subsystem and mixed signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of: starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
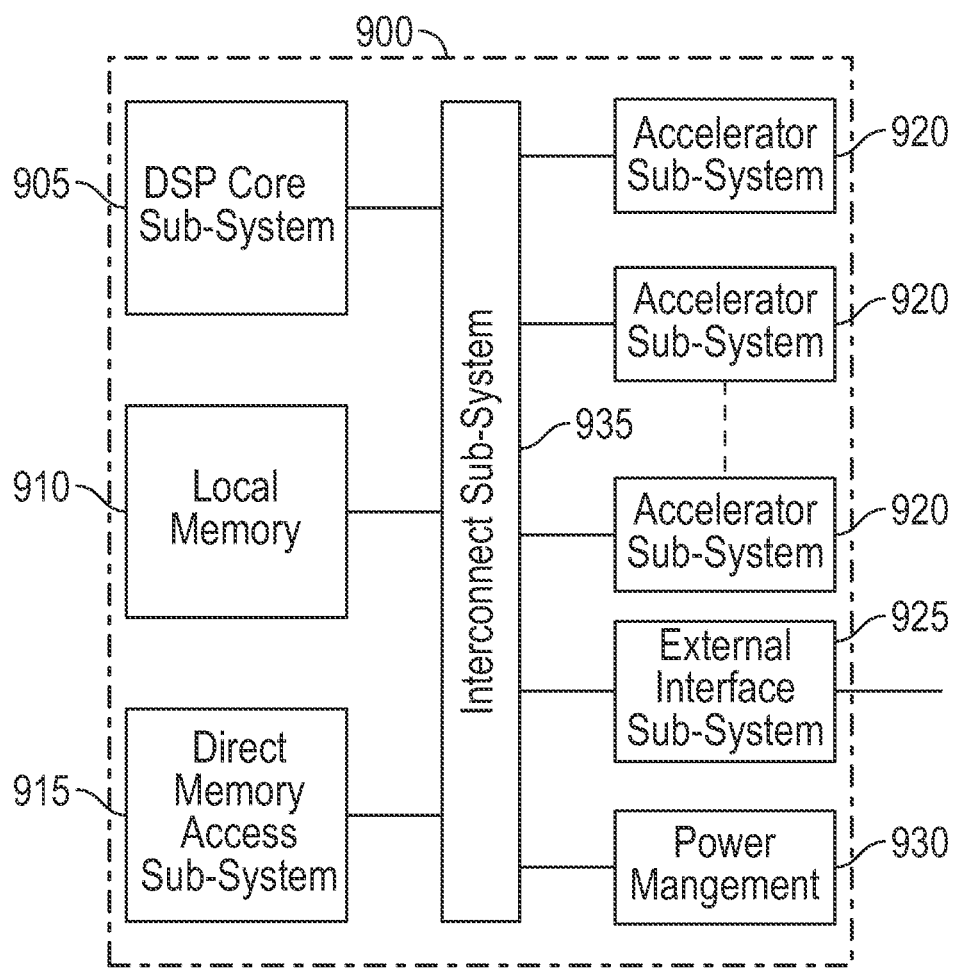
FIG. 9 illustrates an exemplary digital signal processor subsystem, according to some aspects.

FIG. 9 illustrates a digital signal processor (DSP) subsystem 900 according to some aspects. In an aspect, DSP subsystem 900 may include one or more of each of DSP core subsystem 905, local memory 910, direct memory access (DMA) subsystem 915, accelerator subsystem 920A, 920B, . . . 920N, external interface subsystem 925, power management circuitry 930 and interconnect subsystem 935.

In an aspect, the local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, external interface subsystem 925 may provide for transfer of data between local memory 910 and storage external to DSP subsystem 900 under the control of one or more of the DMA subsystem 915 and the DSP core subsystem 905.

Remote Beam Steering for a Repeater

As described earlier herein, there is a general need for beamforming at a repeater without, however, adding to costs of such a repeater. Some available repeaters such as for spectrum below 6 GHz use omnidirectional or wide-beam antennas, thereby not requiring beamforming. However, these repeaters will often fall short of the range specifications for 5G mm Wave.

Some other available repeaters for mm Wave may perform beam steering based only on received signal strength of a mm Wave signal of a gNB, after which the repeater adjusts the repeater beam direction toward the gNB based on the highest signal strength measurement. However, relying only on received signal strength of the gNB for beam steering is highly prone to error because received signals could be coming from any source of energy within or near the RF band, such as other UEs, blockers, interferers, and non-5G sources.

Still other available repeaters may include full RF receiver down-conversion and baseband processors for RF signal monitoring of the gNB to perform beam steering towards the gNB. However, having additional RF receiver down-conversion and baseband hardware in the repeater for processing 5G signals for beam steering purposes adds complexity and cost to each repeater unit, which is not conducive to a low-cost, competitive repeater solution.

Figure 10:
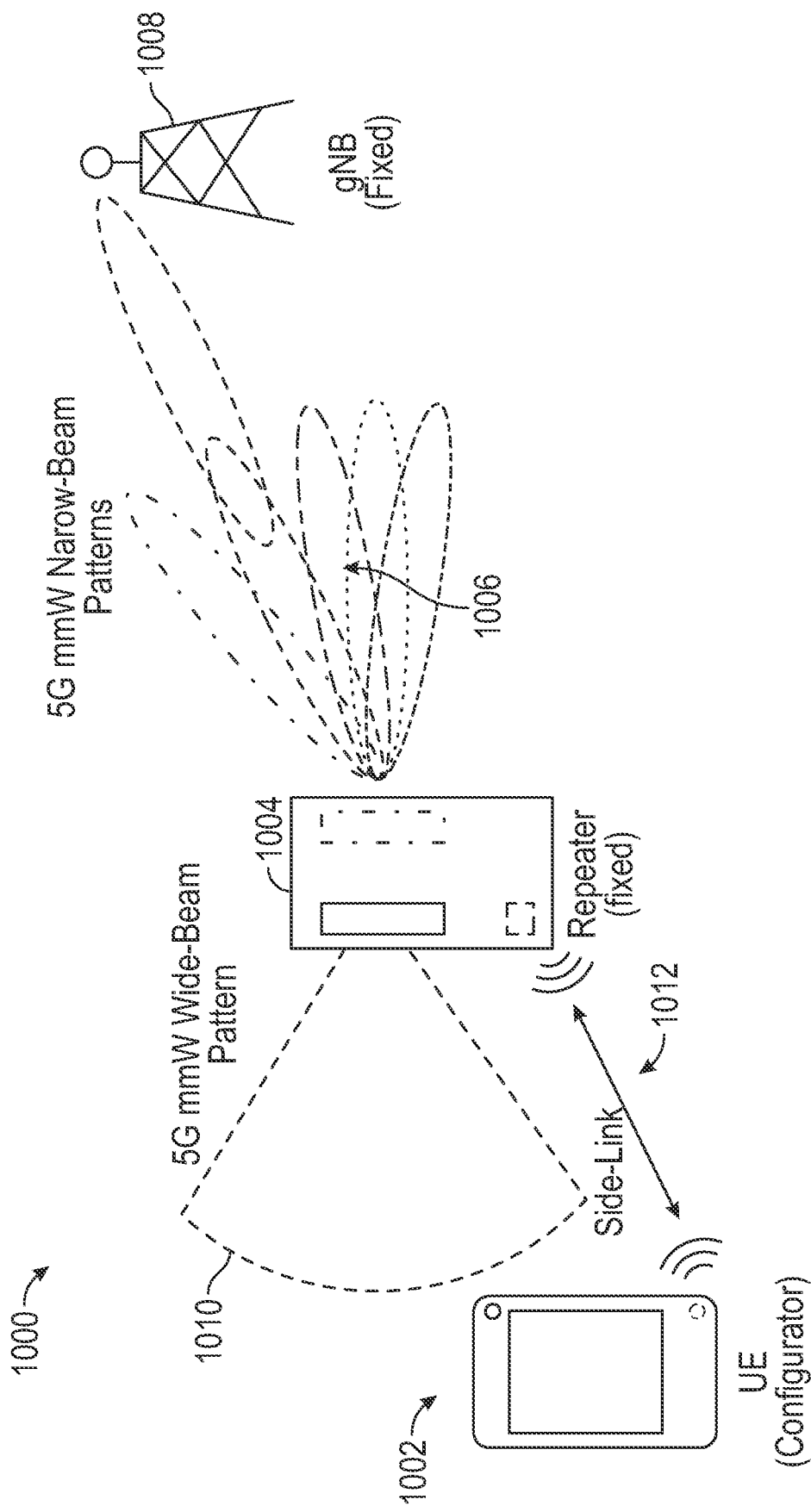
FIG. 10 illustrates a 5G repeater-based system with a user equipment in configurator mode for repeater beam steering according to some aspects.

Aspects of the disclosure address these and other concerns by providing a method for aligning a repeater beam with a gNB. FIG. 10 illustrates a 5G repeater-based system 1000 with a UE 1002 in configurator mode for repeater 1004 beam steering according to some aspects.

The method can include, in an initial phase, configuring the repeater 1004 by aligning the repeater 1004 beam 1006 to gNB 1008. A secondary (side-link) wireless link (e.g., Bluetooth or WLAN) can be set up between the UE 1002 and repeater 1004 to steer the repeater 1004 beam 1006 towards the gNB 1008 during this phase. Standardizing of the side-link or repeater configuration procedure would not be necessary, as the side-link signal is only used during repeater 1004 configuration, and every UE is not required to have the configurator functionality. The side-link signal could potentially use existing standards, such as WiFi or Bluetooth. The side-link signal adds a unique capability to the repeater 1004 to both reduce the cost of the repeater 1004 and to perform configuration of the repeater 1004, allowing product differentiation from other repeaters on the market.

Referring again to FIG. 10, during initial phase, mm Wave beam scanning can be detected between the repeater 1004 and the gNB 1008. In a subsequent phase, the UE 1002 beam 1010 is aligned with the repeater 1004.

While a UE 1002 can be used to perform the above configurations, other devices can be used, for example a dedicated or general-purpose laptop, tablet, or other device capable of executing software packages and of configuring a side-link connection.

Aspects of the disclosure provide a cost-effective solution while maintaining performance needs for 5G mm Wave repeaters by providing a standards-compliant beam steering algorithm and configuration of the repeater without adding the cost of a complete mm Wave receiver and baseband processor to every repeater unit. 5G mm Wave gNBs can be costly, and due to their limited range, many gNBs would need to be installed to get adequate range and penetration for coverage of a site. By replacing many of those gNBs with the most cost-effective repeaters instead, a site installation cost can be significantly reduced. Systems and apparatuses according to aspects make use of standard UE 1002 hardware with software solutions configured on this standard hardware for configuration and beam setup of the repeater 1004 through the side-link interface 1012.

The following details describe a particular application with regards to using a UE 1002 as a method to configure a repeater 1004 for beamforming to a gNB 1008, such as during deployment of the repeater 1004, of which the beam is then statically held until either the repeater 1004 or gNB 1008 is moved, at which point the configuration described herein should be repeated to maintain the desired range and penetrability aspects. Aspects can be extended to other applications, for example, those in which the gNB 1008 or repeater 1004 is mobile. In at least these cases, the UE 1002 should continually monitor and control the repeater 1004 beam 1006 to the gNB 1008 through a side-link interface 1012.

Figure 11:
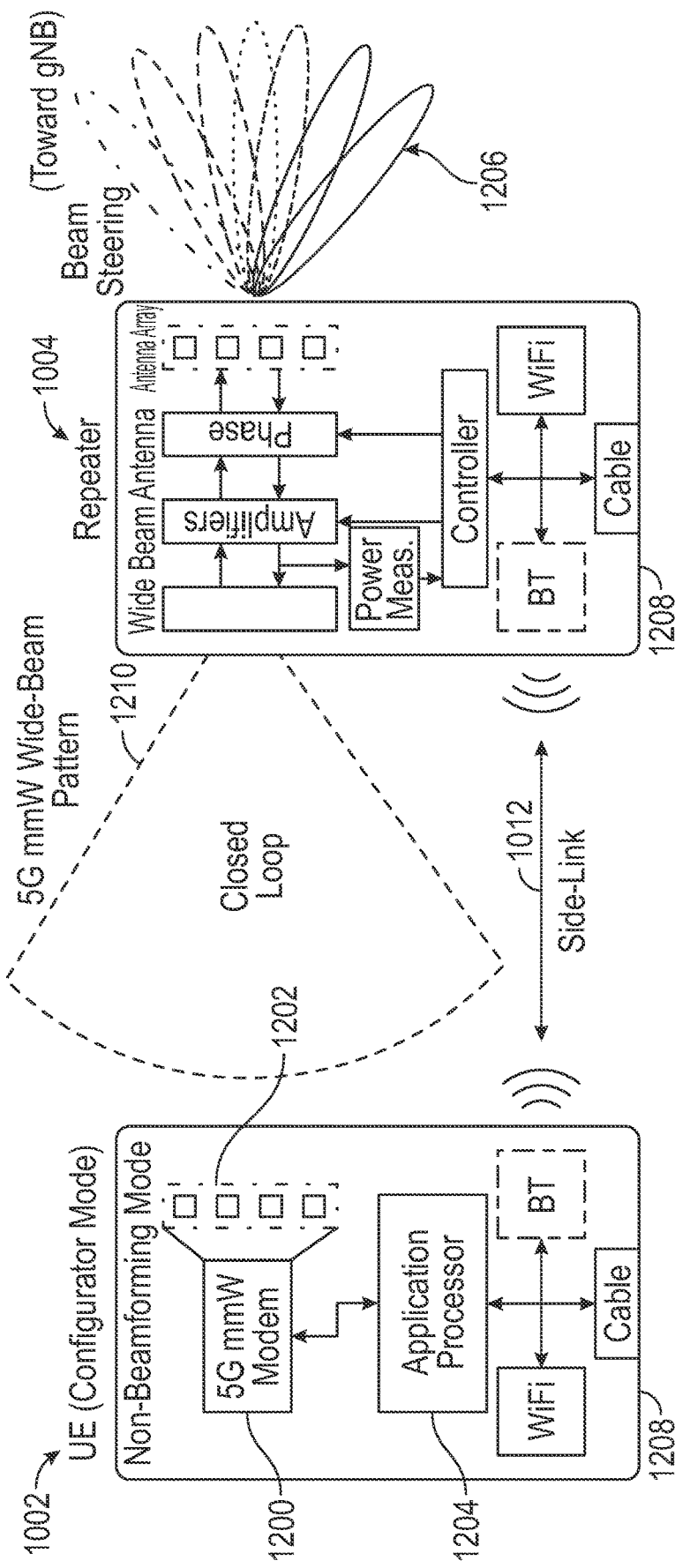
FIG. 11 illustrates a block diagram of a user equipment in configurator mode in communication with a repeater according to some aspects.

In a configuration phase, the UE 1002 is placed into a configurator mode and is attached to the repeater 1004 through a side-link interface 1012 for purposes of performing a closed loop configuration of the repeater 1004. The UE-side of the repeater 1004 can use a wide-beam 1210 or sectored antenna pattern for reaching all of the UEs within its vicinity. While only one UE 1002 is shown in FIG. 11, later figures describe additional UEs. The gNB-side of the repeater uses narrow beams 1104 to meet the full RF range to a gNB 1008.

The repeater 1004 is expected to be in a stationary, fixed position and similarly the gNB 1008 will be in a stationary, fixed position. After the repeater 1004 is mounted into a fixed position, the UE 1002 in configurator mode is connected to the repeater 1004 through a side-link interface 1012 to configure the repeater 1004 as needed. The configuration is based on an algorithm described later herein to steer the narrow beam of the repeater 1004 towards the gNB 1008 and determine the optimum beam direction between the repeater 1004 and gNB 1008. The UE 1002 runs in this configuration mode only during initial setup of the repeater 1004 since the narrow-beam pattern 1104 will not change due to the gNB 1008 and repeater 1004 being in fixed positions.

FIG. 11 illustrates a block diagram of an apparatus of a UE 1002 in configurator mode in communication with a repeater 1004 according to some aspects. The UE 1002 and repeater 1004 will include components not described with respect to FIG. 11 but described with reference to other figures of this disclosure, for example, FIG. 1-9. The UE 1002 will include a receiver including modem circuitry 1200 configured to connect the UE 1002 to a repeater 1004 over a side-link interface 1012 and capable of analyzing signal power and quality to provide accurate beam configuration between the repeater 1004 and the gNB 1008. Having such a receiver is typically standard in most UEs 1002, whereas in contrast a typical low-cost repeater 1004 will not have such an accurate receiver. Providing such a receiver in a repeater 1004 would increase costs and is therefore an undesirable solution to providing accurate beamforming for repeaters.

The UE 1002 in configurator mode becomes the beam management and mm Wave signal processor for narrow-beam steering of the repeater 1004. In other words, the UE 1002 becomes a proxy receiver for the repeater 1004), by providing baseband processing of the 5G mm Wave wide-beam signals 1102 received from the repeater 1004 at RFEM 1202.

The UE 1002 can comprise a standard UE device with no additional hardware but rather algorithms are executed in a standard application processor 1204 (e.g., processing circuitry). The application processor 1204 can control a repeater beamforming process to find a beam angle from the repeater to a gNB that provides better communications than other discrete beam angles that are defined in codebooks for communication between the repeater and the gNB. This repeater beamforming process can be implemented using a beam steering algorithm described later herein with respect to FIG. 13. In this manner, the UE 1002 (through the application processor 1204) can steer the beam 1206 of an external repeater (e.g., repeater 1004) through the side-link interface 1012. In some aspects, the side-link interface 1012 can be a wireless connection such as Bluetooth or WLAN but could also be a cabled connection 1208.

When configuring the repeater 1004, the UE 1002 disables any internal capability the UE 1002 has with regards to beam steering of the UE internal antenna array, that is, the UE 1002 will utilize a non-beamforming pattern such as omnidirectional or wide-beam antenna pattern 1210. The UE 1002 can communicate with the repeater 1004 in such a mode due to the close proximity between the UE 1002 and the repeater 1004 during the configurator mode. The UE 1002 will then send commands to the repeater 1004 through the side-link interface 1012 to steer the repeater 1004 narrow-beam 1206 antenna array. The repeater 1004 effectively becomes an extension of the UE 1002 antennas with regards to beam control.

In some aspects, the 5G mm Wave modem circuitry 1200 within the UE 1002 will include a feature to allow the beam angle setting for the UE 1002 to be accessed by the application processor 1204, including any/all relevant parameters, such as beam gain and measured signal quality. Based on the requested beam angle setting from the 5G mm Wave modem circuitry 1200, the application processor 1204 can provide a beam angle (including any/all relevant parameters) to the repeater 1004, subsequent and responsive to which the repeater 1004 changes the repeater 1004 phase angle to steer the narrow beam 1206 as requested.

Figure 12:
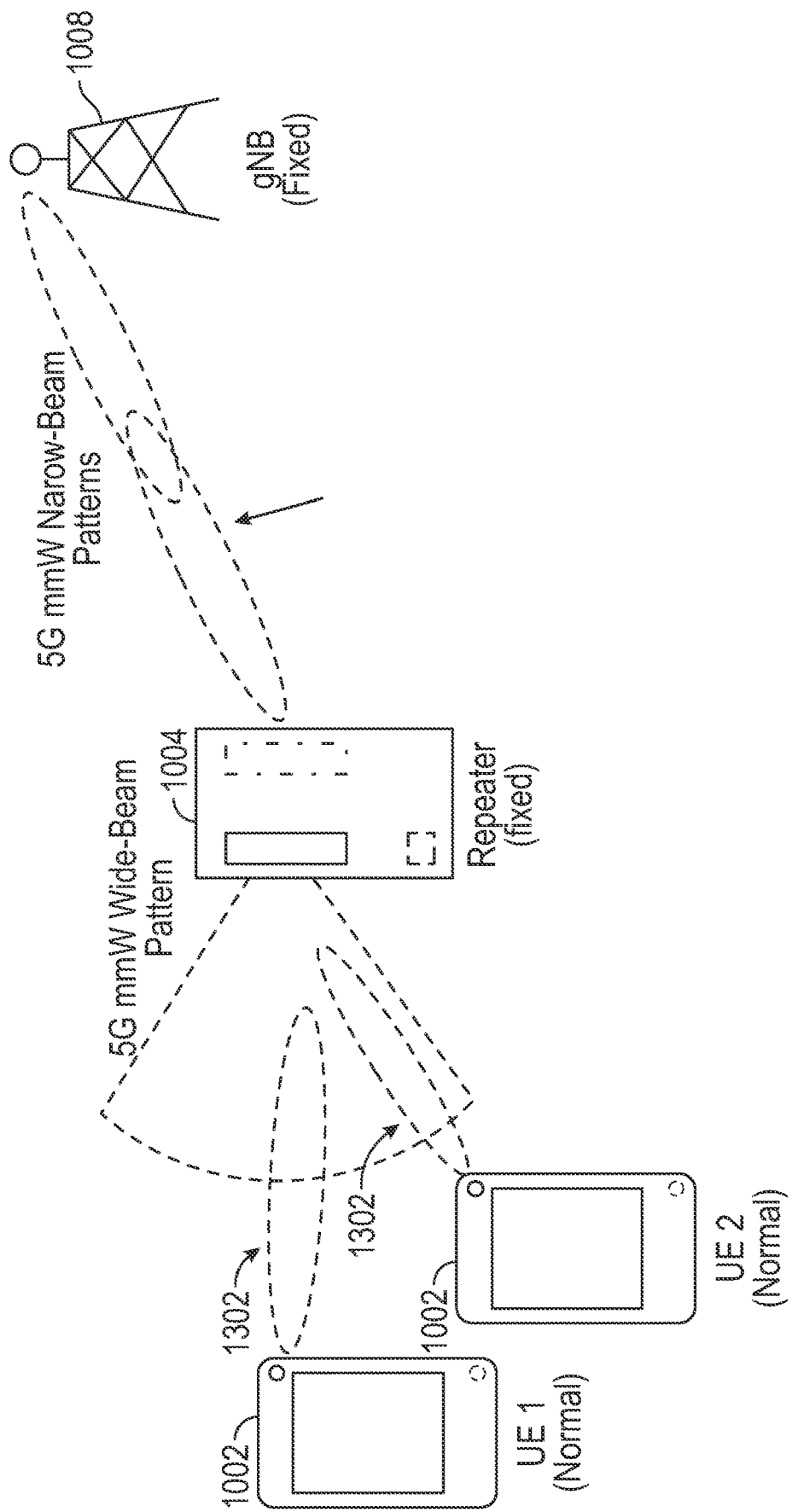
FIG. 12 illustrates a post-configuration operational phase of communication between a user equipment, a repeater, and a gNB according to some aspects.

FIG. 12 illustrates a post-configuration operational phase of communication according to some aspects. After the repeater 1004 has been configured, a UE 1002 that performed configuration can exit configuration mode and perform standard 3GPP compliant beam forming and tracking operation of internal antennas, which will be directed towards the repeater 1004, because the repeater 1004 now provides the strongest signal to a gNB 1008. All UEs within the vicinity of the repeater 1004 have the potential to direct respective beams 1302 towards the repeater 1004.

Figure 13:
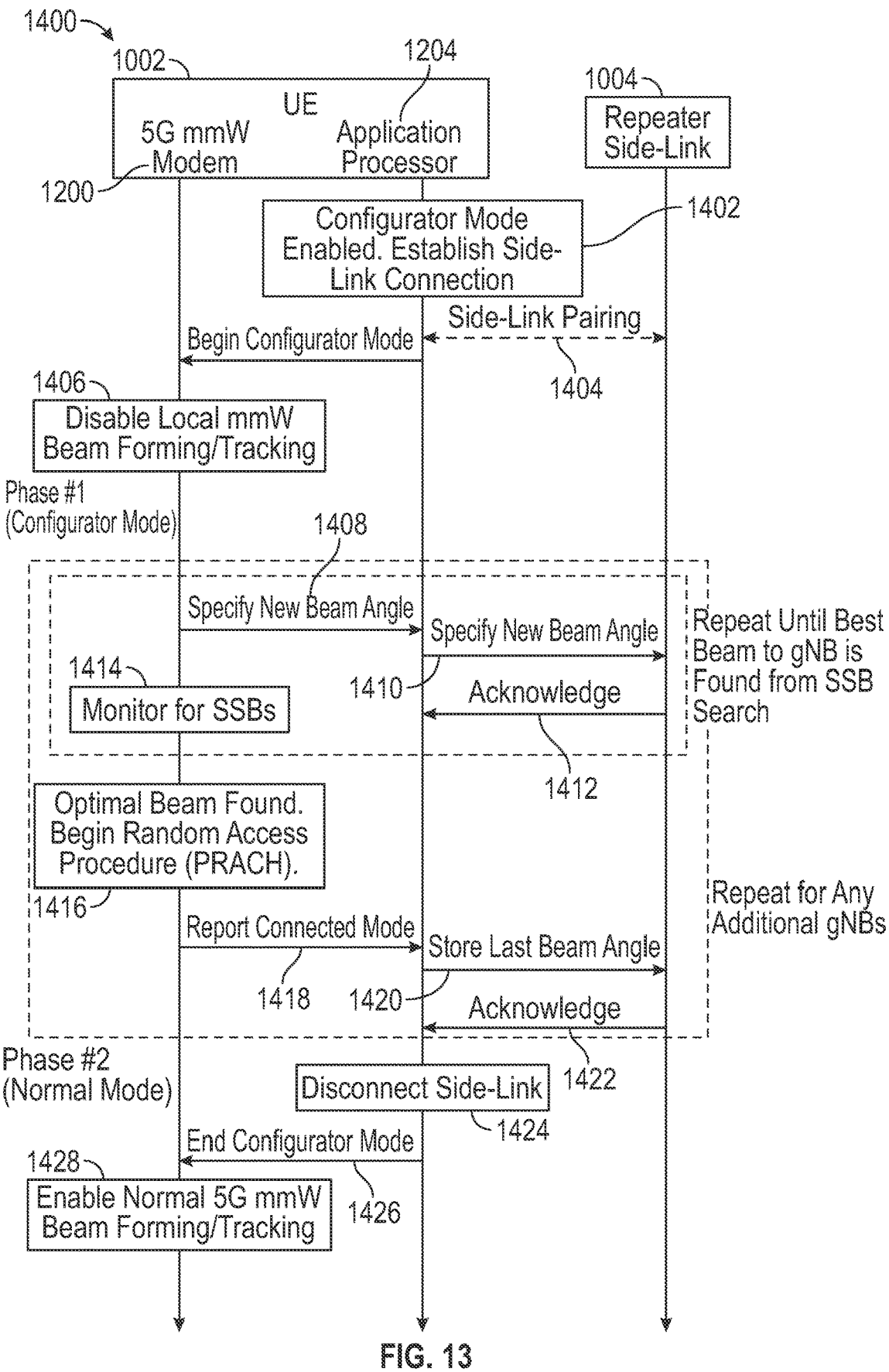
FIG. 13 illustrates a message flow diagram for a user equipment in configurator mode according to some aspects.

FIG. 13 illustrates a message flow diagram 1400 for a user equipment in configurator mode according to some aspects. The UE 1002 in configurator mode can initiate an initial beam acquisition procedure as if the UE 1002 were a standalone device, such procedure as defined by the 3GPP 5G NR mm Wave specification. However, the algorithm depicted in FIG. 14 begins at operation 1402 with a configurator mode being enabled, which can include initiation of a side-link connection (e.g., WLAN, Bluetooth or even a wired connection) using signal 1404 to the repeater 1004.

In operation 1406, the UE modem circuitry 1200 disables any other beamforming or beam tracking. The modem circuitry 1200 specifies a first beam angle to the application processor 1202 in operation 1408. The application processor 1202 communicates this new beam angle to the repeater 1004 in operation 1410, and the repeater 1004 acknowledges this message from the application processor 1202 in message 1412.

In operation 1414, the modem circuitry 1200 monitors conditions to detect whether the beam angle used is the beam angle that will be used for subsequent communications once configuration is completed. For example, the modem circuitry 1200 can monitor the synchronization symbol block (SSB) received from the gNB (FIG. 10) through the repeater 1004. Reception and baseband processing of the 5G mm Wave signals are performed in the UE 1002 using the wide-beam mm Wave 1102 link between the repeater 1004 and the UE 1002, and the full connectivity of the UE 1002 to the gNB (FIG. 10) is based on the appropriate beam angle of the narrow-beam link between the repeater 1004 and the gNB.

The UE 1002 can iterate through operations and signals 1408, 1410, 1412 and 1414 until a beam angle is found that meets communication needs. The beam angle to be used will be determined based on beam finding schemes according to standards of the 3GPP family of standards.

Once a beam angle is found, in operation 1416, the modem circuitry 1200 will commence a procedure to initiate communication using that beam, for example using a random access procedure using a physical random access channel (PRACH) according to standards of the 3GPP family of standards. Receive and transmit antenna reciprocity is used between the repeater 1004 and the gNB (FIG. 10), that is, the optimal received beam angle configured in the repeater 1004 during SSB searching is also used as the beam angle for transmitting from the repeater 1004 back to the gNB.

In operation 1418, the modem circuitry 1200 will report to the application processor 1204 that the UE 1002 is now in connected mode, and the application processor 1204 will provide a command 1420 instructing the repeater 1004 to store the beam angle used. The repeater 1004 will acknowledge the command 1420 in signal 1422 and the application processor 1204 and repeater 1004 will disconnect the side-link interface 1012 in operation 1424. The repeater 1004 becomes a standalone device unless and until the repeater 1004 or a gNB moves from the current location, at which point the operations of FIG. 14 may need to be repeated. The repeater 1004 can monitor signal strength from the gNB and switch beams to different gNBs as necessary based on measured signal strength of the narrow-beam link and the priorities for each stored beam angle provided during the configuration process.

The application processor 1204 will provide signal 1426 to indicate to the modem circuitry 1200 that configuration mode is ended. Responsive to signal 1426, the modem circuitry 1200 will enable standard 5G mm Wave communication and initiate standard UE 1002 beam forming and beam tracking in operation 1428. Thereafter, the UE 1002 and other UEs in the vicinity will use the repeater 1004 for communication to a gNB (FIG. 10).

During configuration (e.g., between operations 1406 and 1426), the UE 1002 (or the application processor 1204) can proceed to look for other gNBs and store those resulting beam angles and additional configurations in the repeater 1004. For multiple beam configurations for multiple gNBs, the UE 1002 can specify a gNB priority to the repeater 1004 of those configurations from best to least optimal, such as based on signal quality (e.g., signal-to-noise measurements such as signal to noise ratio (SNR)).

Figure 14:
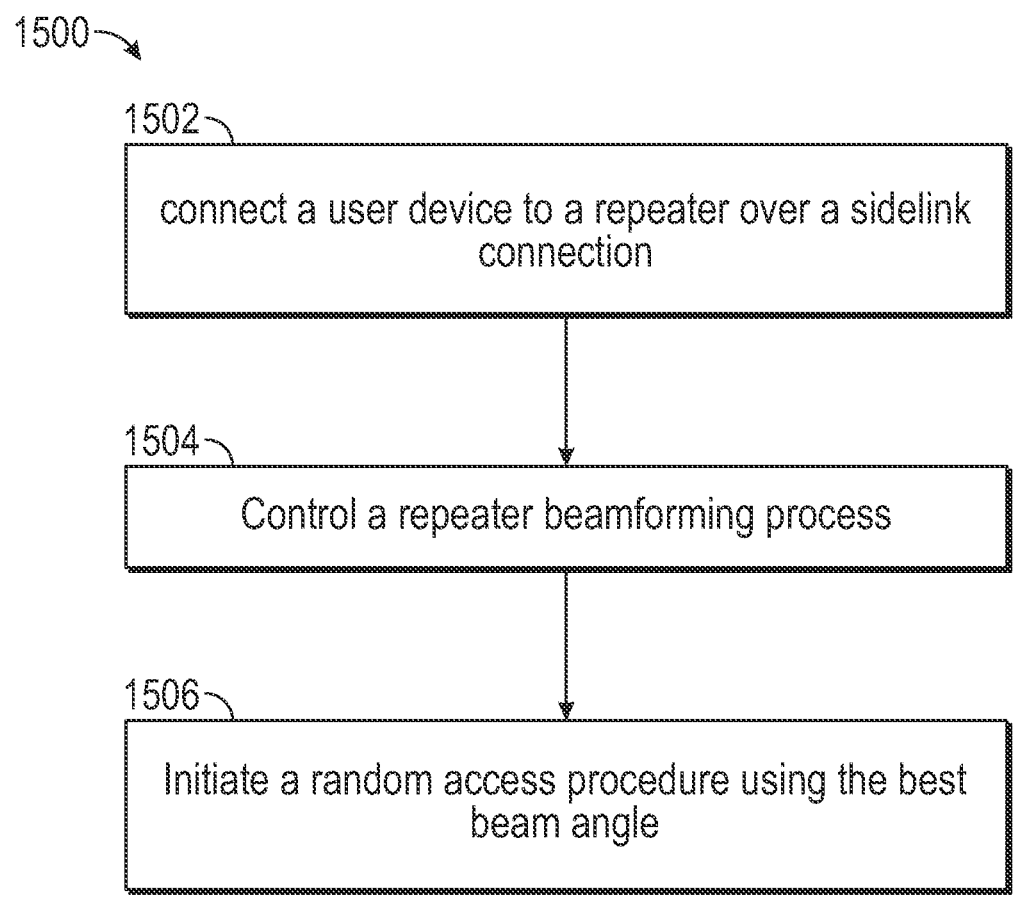
FIG. 14 illustrates a flow diagram of a method for configuring repeater beamforming according to some aspects.

The software application used on the UE 1002 to perform the operations of FIG. 14 can comprise instructions having special access rights to the 5G modem circuitry 1200 within the UE to access 5G signaling information as well as override (or disable) the internal beam steering algorithm for the UE 1002 internal antennas. In addition, the specialized configurator software application on the UE 1002 can implement a beam steering algorithm and control of the repeater 1004 antenna array using a proprietary control protocol over the side-link interface 1012.

By implementation of the above, apparatuses and systems according to some aspects provide a method for a UE 1002 in configuration mode to align the beam angle between the repeater 1004 and a gNB 1008. A 5G mm Wave narrow-beam pattern is provided between a gNB 1008 and repeater 1004. A 5G mm Wave wide-beam pattern is provided between a repeater 1004 and UE 1002 in a configurator mode. A UE 1002 in a configurator mode implements a beam control algorithm on behalf of a repeater 1004, thereby removing the need for specialized software or sophisticated beamforming systems within the repeater 1004, which would increase costs of the repeater 1004. A side-link interface (e.g., Bluetooth/WLAN) is added between the UE 1002 in configurator mode and the repeater 1004 for closed loop beam control of the narrow-beam pattern between the gNB 1008 and the repeater 1004.

Figure 15:
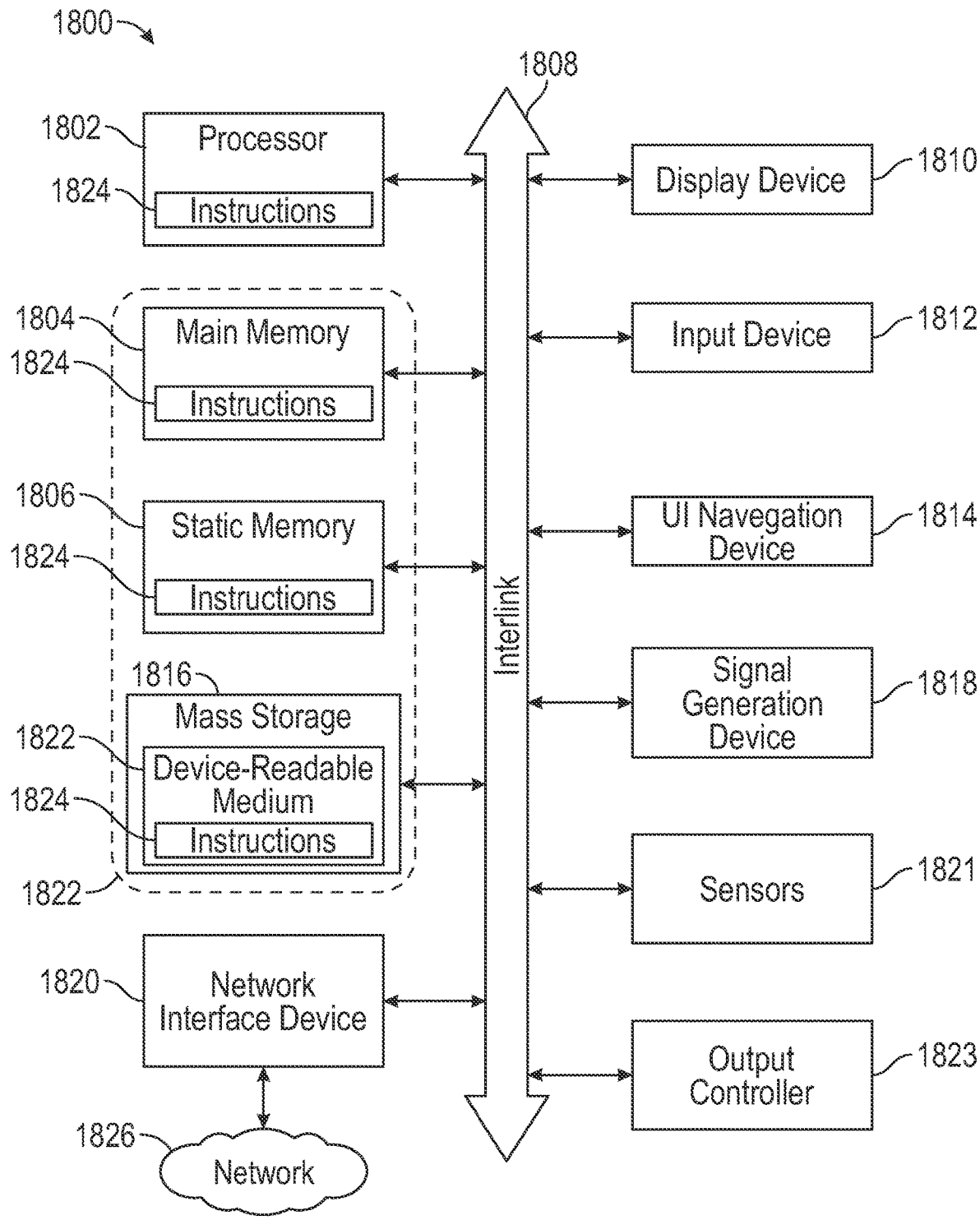
FIG. 15 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 15 illustrates a flow diagram of a method 1500 for configuring repeater beamforming according to some aspects. The method 1500 can be performed by, for example, application processor 1204 (FIG. 12) or another component of FIG. 12 (for example modem circuitry 1200, etc.). Some of the operations of method 1500 are described in more detail above with respect to FIG. 14.

The method 1500 can begin with operation 1502 with the application processor 1204 connecting a user device (e.g., UE 1002) to a repeater (e.g., repeater 1004)) over a side-link interfa.ce (e.g., interface 1012 (FIG. 10). Non-side-link connections can be disabled at this point, or functionality over non-side-link connections can be reduced. Subsequent to configuration operations described herein, side-link communications can be disabled, at least with respect to any configuration operations, and non-side-link communications (e.g, standard repeater communications) can be re-enabled.

The method 1500 can continue with operation 1504 with the application processor 1204 controlling a repeater 1004 beamforming process to find a beam angle from the repeater 1004 to a base station (e.g., gNB 1008 (FIG. 10)).

The method 1500 can continue with operation 1506 with the modem circuitry 1200 initiating a random access procedure using the beam angle. The method 1500 can include additional operations such as connecting to an additional repeater over the side-link connection and controlling the additional repeater to find a second beam angle from the additional repeater to the base station. Configuration information for the additional repeater can be stored in memory associated with the UE 1002, application processor 1204, etc. The method 1500 can further comprise detecting an interference condition in communications with the repeater and initiating access to an additional repeater responsive to the detecting. The stored configuration information can be used for initiating access to any repeater for which information has been detected and stored.

Other Systems and Apparatuses

FIG. 15 illustrates a block diagram of a communication device 1800 such as an evolved Node-B (eNB), a new generation Node-B (gNB), an access point (AP), a wireless station (STA), a mobile station (MS), or a user equipment (UE), in accordance with some aspects. In alternative aspects, the communication device 1800 may operate as a standalone device or may be connected (e.g., networked) to other communication devices. In some aspects, the communication device 1800 can use one or more of the techniques and circuits discussed herein, in connection with any of FIG. 1-FIG. 14.

Circuitry (e.g., processing circuitry) is a collection of circuits implemented in tangible entities of the device 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1800 follow.

In some aspects, the device 1800 may operate as a standalone device or may be connected (e.g., networked) to other devices. In a networked deployment, the communication device 1800 may operate in the capacity of a server communication device, a client communication device, or both in server-client network environments. In an example, the communication device 1800 may act as a peer communication device in peer-to-peer (P2P) (or other distributed) network environment. The communication device 1800 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1800 may include a hardware processor 1802 (e.g., a central processing unit (CPU), a graphics processing unit (GPU), a hardware processor core, or any combination thereof), a main memory 1804, a static memory 1806, and mass storage 1816 (e.g., hard drive, tape drive, flash storage, or other block or storage devices), some or all of which may communicate with each other via an interlink (e.g., bus) 1808.

The communication device 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The communication device 1800 may additionally include a signal generation device 1818 (e.g., a speaker), a network interface device 1820, and one or more sensors 1821, such as a global positioning system (GPS) sensor, compass, accelerometer, or other sensor. The communication device 1800 may include an output controller 1828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1816 may include a communication device-readable medium 1822, on which is stored one or more sets of data structures or instructions 1824 (e.g., software) embodying or utilized by any one or more of the techniques or functions described herein. In some aspects, registers of the processor 1802, the main memory 1804, the static memory 1806, and/or the mass storage 1816 may be, or include (completely or at least partially), the device-readable medium 1822, on which is stored the one or more sets of data structures or instructions 1824, embodying or utilized by any one or more of the techniques or functions described herein. In an example, one or any combination of the hardware processor 1802, the main memory 1804, the static memory 1806, or the mass storage 1816 may constitute the device-readable medium 1822.

As used herein, the term "device-readable medium" is interchangeable with "computer-readable medium" or "machine-readable medium". While the communication device-readable medium 1822 is illustrated as a single medium, the term "communication device-readable medium" may include a single medium or multiple media (e.g., a centralized or distributed database, and/or associated caches and servers) configured to store the one or more instructions 1824.

The term "communication device-readable medium" may include any medium that is capable of storing, encoding, or carrying instructions for execution by the communication device 1800 and that cause the communication device 1800 to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), MIMO, or multiple-input single-output (MISO) techniques. In some examples, the network interface device 1820 may wirelessly communicate using Multiple User MIMO techniques.

The term "transmission medium" shall be taken to include any intangible medium that is capable of storing, encoding, or carrying instructions for execution by the communication device 1800, and includes digital or analog communications signals or other intangible medium to facilitate communication of such software. In this regard, a transmission medium in the context of this disclosure is a device-readable medium.

Figure 16:
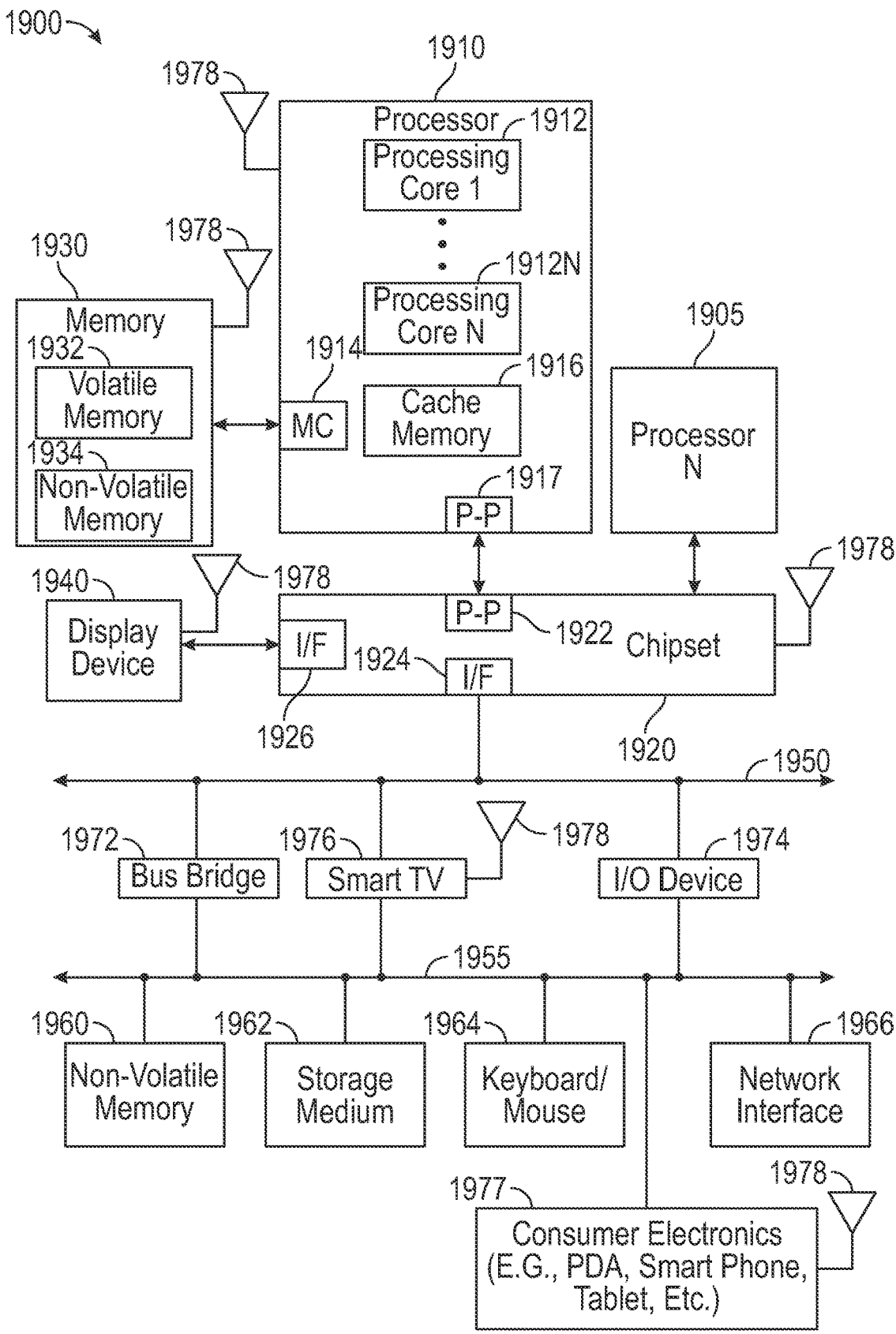
FIG. 16 illustrates a system level diagram, depicting an example of an electronic device (e.g., system) that can include, for example, a transmitter configured to selectively fan out a signal to one of multiple communication channels.

FIG. 16 illustrates a system level diagram, depicting an example of an electronic device (e.g., system) that can include, for example, a transmitter configured to selectively fan out a signal to one of multiple communication channels. FIG. 16 is included to show an example of a higher-level device application for the subject matter discussed above with regards to FIGS. 1-15. In one aspect, system 1900 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance, or any other type of computing device. In some aspects, system 1900 is a system on a chip (SOC) system.

In one aspect, processor 1910 has one or more processor cores 1912, . . . , 1912N, where 1912N represents the Nth processor core inside processor 1910 where N is a positive integer. In one aspect, system 1900 includes multiple processors including 1910 and 1905, where processor 1905 has logic similar or identical to the logic of processor 1910. In some aspects, processing core 1912 includes, but is not limited to, pre-fetch logic to fetch instructions, decode logic to decode the instructions, execution logic to execute instructions and the like. In some aspects, processor 1910 has a cache memory 1916 to cache instructions and/or data for system 1900. Cache memory 1916 may be organized into a hierarchal structure including one or more levels of cache memory.

In some aspects, processor 1910 includes a memory controller 1914, which is operable to perform functions that enable the processor 1910 to access and communicate with memory 1930 that includes a volatile memory 1932 and/or a non-volatile memory 1934. In some aspects, processor 1910 is coupled with memory 1930 and chipset 1920. Processor 1910 may also be coupled to a wireless antenna 1978 to communicate with any device configured to transmit and/or receive wireless signals. In one aspect, an interface for wireless antenna 1978 operates in accordance with, but is not limited to, the IEEE 802.11 standard and its related family, Home Plug AV (HPAV), Ultra Wide Band (UWB), Bluetooth, WiMax, or any form of wireless communication protocol.

In some aspects, volatile memory 1932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1934 includes, but is not limited to, flash memory, phase change memory (PCM), read-only memory (ROM), electrically erasable programmable read-only memory (EEPROM), or any other type of non-volatile memory device.

Memory 1930 stores information and instructions to be executed by processor 1910. In one aspect, memory 1930 may also store temporary variables or other intermediate information while processor 1910 is executing instructions. In the illustrated aspect, chipset 1920 connects with processor 1910 via Point-to-Point (PtP or P-P) interfaces 1917 and 1922. Chipset 1920 enables processor 1910 to connect to other elements in system 1900. In some aspects of the example system, interfaces 1917 and 1922 operate in accordance with a PtP communication protocol such as the Intel® QuickPath Interconnect (QPI) or the like. In other aspects, a different interconnect may be used.

In some aspects, chipset 1920 is operable to communicate with processor 1910, 1905N, display device 1940, and other devices, including a bus bridge 1972, a smart TV 1976, I/O devices 1974, nonvolatile memory 1960, a storage medium (such as one or more mass storage devices) 1962, a keyboard/mouse 1964, a network interface 1966, and various forms of consumer electronics 1977 (such as a PDA, smart phone, tablet etc.), etc. In one aspect, chipset 1920 couples with these devices through an interface 1924. Chipset 1920 may also be coupled to a wireless antenna 1978 to communicate with any device configured to transmit and/or receive wireless signals.

Chipset 1920 connects to display device 1940 via interface 1926. Display 1940 may be, for example, a liquid crystal display (LCD), a plasma display, cathode ray tube (CRT) display, or any other form of visual display device. In some aspects of the example system, processor 1910 and chipset 1920 are merged into a single SOC. In addition, chipset 1920 connects to one or more buses 1950 and 1955 that interconnect various system elements, such as I/O devices 1974, nonvolatile memory 1960, storage medium 1962, a keyboard/mouse 1964, and network interface 1966. Buses 1950 and 1955 may be interconnected together via a bus bridge 1972.

In one aspect, mass storage device 1962 includes, but is not limited to, a solid-state drive, a hard disk drive, a universal serial bus flash memory drive, or any other form of computer data storage medium. In one aspect, network interface 1966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one aspect, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 16 are depicted as separate blocks within the system 1900, the functions performed by some of these blocks may be integrated within a single semiconductor circuit or may be implemented using two or more separate integrated circuits. For example, although cache memory 1916 is depicted as a separate block within processor 1910, cache memory 1916 (or selected aspects of 1916) can be incorporated into processor core 1917.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect", "some aspects", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to desctibe a common object, merely indicate that different instances of like objects are being referred to and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may, for example, be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); IEEE 802.11ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB). Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mm Wave) frequency band), e.g., a frequency band within the frequency band of between 20 GHz and 300 GHz, a frequency band above 45 GHz, a frequency band below 20 GHz, e.g., a Sub 1 GHz (S1G) band, a 2,4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g, silicon blocks of various chips and/or processors. Logic may be included in, and/or implemented, as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

ADDITIONAL NOTES AND ASPECTS

Example 1 is an apparatus of a user equipment (UE), the apparatus comprising: modem circuitry configured to connect the UE to a repeater over a side-link connection; and processing circuitry coupled to the modem circuitry and configured to control a repeater beamfonning process to select a beam angle from the repeater to a base station; and initiate a communication procedure using the selected beam angle.

In Example 2, the subject matter of Example 1 can optionally include wherein the communication procedure includes a random access procedure.

In Example 3, the subject matter of any one of Example 1-2 can optionally comprise memory, wherein the modem circuitry is configured to connect to an additional repeater over the side-link connection, and wherein the processing circuitry is configured to control the additional repeater to find an additional beam angle from the additional repeater to the base station and to store configuration information for the additional repeater in the memory.

In Example 4, the subject matter of Example 3 can optionally include wherein the processing circuitry is further configured to detect an interference condition in communications with the repeater; and initiate access to the additional repeater responsive to the detecting and using the stored configuration information for the additional repeater.

In Example 5, the subject matter of any one of Examples 1-4 can optionally include wherein the processing circuitry is further configured to: disable non-side-link beamforming and beam tracking upon connecting the repeater over the side-link; and re-enable non-side-link beamforming and beam tracking upon disconnecting the side-link connection.

In Example 6, the subject matter of any one of Examples 1-5 can optionally include wherein the controlling comprises controlling the repeater to communicate, successively, over a plurality of beam angles until a beam angle is selected for communicating to the base station based on signal quality.

Example 7 is a non-transitory computer-readable medium including instructions that, when executed on a processor, cause the processor to perform operations including: connecting a user device to a repeater over a side-link connection; controlling a repeater beamforming process, by the user device, to select a beam angle from the repeater to a base station; and initiating, by the user device, a communication procedure using the selected beam angle.

In Example 8, the subject matter of Example 7 can optionally include connecting to an additional repeater over the side-link connection; controlling the additional repeater to find a second beam angle from the additional repeater to the base station; and storing configuration information for the additional repeater.

In Example 9, the subject matter of Example 8 can optionally include detecting an interference condition in communications with the repeater; and initiating access to the additional repeater responsive to the detecting and using the stored configuration information for the additional repeater.

In Example 10, the subject matter of any one of Examples 7-9 can optionally include disabling non-side-link beamforming and beam tracking upon connecting the repeater over the side-link; and re-enabling non-side-link beamforming and beam tracking upon disconnecting the side-link connection.

In Example 11, the subject matter of any one of Examples 7-10 can optionally include wherein the user device communicates to the repeater using an omnidirectional, non-beamforming antenna pattern.

In Example 12, teh subject matter of any one of Examples 7-11 can optionally include wherein the controlling comprises controlling the repeater to communicate, successively, over a plurality of beam angles until a beam angle is selected for communicating to the base station.

In Example 13, the subject matter of any one of Examples 7-12 can optionally include wherein the controlling comprises monitoring a synchronization symbol block (SSB) to detect the beam angle.

In Example 14, the subject matter of any one of Examples 7-13 can optionally include wherein the base station comprises a 5th generation NodeB (gNB).

In Example 15, the subject matter of any one of Examples 7-14 can optionally include wherein the side-link connection comprises a Bluetooth connection.

In Example 16, the subject matter of any one of Examples 7-15 can optionally include wherein the side-link connection comprises a wireless local area network (WLAN) connection.

In Example 17, the subject matter of any one of Examples 7-16 can optionally include wherein the side-link connection comprises a wired connection.

Example 18 is a method for configuring repeater beamforming, the method comprising: connecting a user device to a repeater over a side-link connection; controlling a repeater beamforming process to select a beam angle from the repeater to a base station, and initiating a communication procedure using the selected angle.

In Example 19, the subject matter of Example 18 can optionally include connecting to an additional repeater over the side-link connection; controlling the additional repeater to find a second beam angle from the additional repeater to the base station; and storing configuration information for the additional repeater.

In Example 20, the subject matter of Example 19 can optionally include detecting an interference condition in communications with the repeater; and initiating access to the additional repeater responsive to the detecting and using the stored configuration information for the additional repeater.

In Example 21, the subject matter of any one of Examples 18-20 can optionally include disabling non-side-link beamforming and beam tracking upon connecting the repeater over the side-link; and re-enabling non-side-link beamforming and beam tracking upon disconnecting the side-link connection.

Example 22 is an apparatus of a repeater, the apparatus comprising: an interface to a user equipment (UE); and control circuitry coupled to the interface, the control circuitry configured to receive one or more beamforming angles, comprising a set of beamforming angles, from the UE over the interface; successively communicate to a base station using the one or more beamforming angles and monitoring a synchronization symbol block (SSB) to detect an angle of the one or more beamforming angles.

In Example 23, the subject matter of Example 22 can optionally include wherein the control circuitry is further configured to disable the interface upon detection of the angle.

In Example 24, the subject matter of any one of Examples 22-23 can optionally include wherein the interface comprises one of a Bluetooth connection, a wireless local area network (WLAN) and a wired connection.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. An apparatus of a user equipment (UE), the apparatus comprising:
   modem circuitry configured to connect the UE to a repeater over a side-link connection; and
   processing circuitry coupled to the modem circuitry and configured to:
   control a repeater beamforming process to select a beam angle from the repeater to a base station; and
   initiate a communication procedure using the selected beam angle;

disable non-side-link beamforming and beam tracking upon connecting the repeater over the side-link connection; and re-enable non-side-link beamforming and beam tracking upon disconnecting the side-link connection.

2. The apparatus of claim 1, wherein the communication procedure includes a random access procedure.

3. The apparatus of claim 1, further comprising memory, wherein the modem circuitry is configured to connect to an additional repeater over the side-link connection, and wherein the processing circuitry is configured to control the additional repeater to find an additional beam angle from the additional repeater to the base station and to store configuration information for the additional repeater in the memory.

4. The apparatus of claim 3, wherein the processing circuitry is further configured to:

detect an interference condition in communications with the repeater; and initiate access to the additional repeater responsive to the detecting and using the stored configuration information for the additional repeater.

5. The apparatus of claim 1, wherein the controlling comprises controlling the repeater to communicate, successively, over a plurality of beam angles until a beam angle is selected for communicating to the base station based on signal quality.

6. A non-transitory computer-readable medium including instructions that, when executed on a processor, cause the processor to perform operations including:

connecting a user device to a repeater over a side-link connection;

controlling a repeater beamforming process, by the user device, to select a beam angle from the repeater to a base station;

initiating, by the user device, a communication procedure using the selected beam angle;

disabling non-side-link beamforming and beam tracking upon connecting the repeater over the side-link connection; and re-enable non-side-link beamforming and beam tracking upon disconnecting the side-link connection.

7. The non-transitory computer-readable medium of claim 6, wherein the operations further comprise:

connecting to an additional repeater over the side-link connection;

controlling the additional repeater to find a second beam angle from the additional repeater to the base station; and storing configuration information for the additional repeater.

8. The non-transitory computer-readable medium of claim 7, wherein the operations further comprise:

detecting an interference condition in communications with the repeater; and initiating access to the additional repeater responsive to the detecting and using the stored configuration information for the additional repeater.

9. The non-transitory computer-readable medium of claim 6, wherein the user device communicates to the repeater using an omnidirectional, non-beamforming antenna pattern.

10. The non-transitory computer-readable medium of claim 6, wherein the controlling comprises controlling the repeater to communicate, successively, over a plurality of beam angles until a beam angle is selected for communicating to the base station.

11. The non-transitory computer-readable medium of claim 6, wherein the controlling comprises monitoring a synchronization symbol block (SSB) to detect the beam angle.

12. The non-transitory computer-readable medium of claim 6, wherein the base station comprises a 5th generation NodeB (gNB).

13. The non-transitory computer-readable medium of claim 6, wherein the side-link connection comprises a Bluetooth connection.

14. The non-transitory computer-readable medium of claim 6, wherein the side-link connection comprises a wireless local area network (WLAN) connection.

15. The non-transitory computer-readable medium of claim 6, wherein the side-link connection comprises a wired connection.

16. A method for configuring repeater beamforming, the method comprising:

connecting a user device to a repeater over a side-link connection;

controlling a repeater beamforming process to select a beam angle from the repeater to a base station;

initiating a communication procedure using the selected angle;

disabling non-side-link beamforming and beam tracking upon connecting the user device to the repeater over the side-link connection; and re-enabling non-side-link beamforming and beam tracking upon disconnecting the side-link connection.

17. The method of claim 16, further comprising:

connecting to an additional repeater over the side-link connection;

controlling the additional repeater to find a second beam angle from the additional repeater to the base station; and storing configuration information for the additional repeater.

18. The method of claim 17, further comprising:

detecting an interference condition in communications with the repeater; and initiating access to the additional repeater responsive to the detecting and using the stored configuration information for the additional repeater.

* * * * *